United States Patent
Jarvis

(10) Patent No.: US 11,766,737 B2
(45) Date of Patent: Sep. 26, 2023

(54) METHOD FOR MANUFACTURING A METAL BASED COMPONENT AND A SINGLE-PIECE, METAL BASED COMPONENT

(71) Applicant: HIPtec AS, Oslo (NO)

(72) Inventor: David Jarvis, Oslo (NO)

(73) Assignee: HIPTEC AS, Oslo (NO)

( * ) Notice: Subject to any disclaimer, the term of this patent is extended or adjusted under 35 U.S.C. 154(b) by 354 days.

(21) Appl. No.: 16/754,227

(22) PCT Filed: Oct. 15, 2018

(86) PCT No.: PCT/EP2018/078113
§ 371 (c)(1),
(2) Date: Apr. 7, 2020

(87) PCT Pub. No.: WO2019/073085
PCT Pub. Date: Apr. 18, 2019

(65) Prior Publication Data
US 2020/0269346 A1    Aug. 27, 2020

(30) Foreign Application Priority Data
Oct. 13, 2017   (EP) ..................................... 17196414

(51) Int. Cl.
*B23K 20/00* (2006.01)
*B23K 20/02* (2006.01)
(Continued)

(52) U.S. Cl.
CPC ............ *B23K 20/021* (2013.01); *B32B 15/01* (2013.01); *B23K 2101/18* (2018.08); *B23K 2103/18* (2018.08)

(58) Field of Classification Search
CPC .......... B22F 3/15; B23P 15/26; B23K 1/0012; B23K 20/021; B23K 20/023; B23K 2101/06; B23K 2101/14
See application file for complete search history.

(56) References Cited

U.S. PATENT DOCUMENTS

| 5,094,699 A | 3/1992 | Feichtinger et al. |
| 7,900,811 B1 | 3/2011 | Alman et al. |
(Continued)

FOREIGN PATENT DOCUMENTS

| EP | 0710172 | 5/1996 |
| EP | 0710172 A1 | 5/1996 |
(Continued)

OTHER PUBLICATIONS

International Search Report for PCT application No. PCT2018078113 (WO2019073085) dated Jan. 25, 2019, which is the parent application to the instant application, 4 pages.
(Continued)

*Primary Examiner* — Erin B Saad
(74) *Attorney, Agent, or Firm* — HARNESS, DICKEY & PIERCE, P.L.C.; Anthony Fussner

(57) ABSTRACT

The invention relates to a method for manufacturing a solid metal based component. The method comprising the steps of providing a plurality of metal based sheets; arranging the plurality of metal based sheets in a stack, 5 wherein the stack comprises a first metal based sheet, a last metal based sheet and at least one intermediate metal based sheet; perimetrically sealing at least a portion of the stack forming at least one cavity inside of the stack; removing gas from said at least one cavity, and subjecting the stack to a hot isostatic pressing process for a predetermined time at a predetermined 10 pressure and a predetermined temperature so that the plurality of metal based sheets of the stack bond metallurgically to each other to form a solid metal based (Continued)

component. The invention further relates to a single-piece metal based component.

17 Claims, 9 Drawing Sheets

(51) Int. Cl.
    *B32B 15/01*     (2006.01)
    *B23K 103/18*     (2006.01)
    *B23K 101/18*     (2006.01)

(56) References Cited

U.S. PATENT DOCUMENTS

| | | | | |
|---|---|---|---|---|
| 9,714,577 | B2* | 7/2017 | Kington | B23P 15/006 |
| 9,908,206 | B2* | 3/2018 | Rigal | B23K 26/24 |
| 9,938,896 | B2* | 4/2018 | Bannari | F28F 21/083 |
| 10,040,122 | B2* | 8/2018 | Chase | B22F 5/009 |
| 10,399,191 | B2* | 9/2019 | Rigal | B23P 15/26 |
| 11,022,384 | B2* | 6/2021 | Barriga | F28F 3/086 |
| 11,209,223 | B2* | 12/2021 | Streeter | F28D 9/0062 |
| 2012/0160900 | A1 | 6/2012 | Rigal et al. | |
| 2012/0168078 | A1 | 7/2012 | Couturier et al. | |
| 2015/0298267 | A1 | 10/2015 | Rigal et al. | |
| 2016/0107274 | A1 | 4/2016 | Rigal et al. | |

FOREIGN PATENT DOCUMENTS

| | | |
|---|---|---|
| WO | WO8201510 | 5/1982 |
| WO | WO-8201510 A1 | 5/1982 |

OTHER PUBLICATIONS

Extended European Search Report and Written Opinion for EP Application No. 17196414,1. which is the parent application to the instant application, dated Apr. 24, 2018, 9 pages.

International Preliminary Report for PCT2018078113 which is the parent application to the instant application, dated Feb. 6, 2020, 23 pages.

European Office Action for EP Application No. 17196414,1 which is the parent application to the instant application, dated Nov. 28, 2022, 6 pages.

* cited by examiner

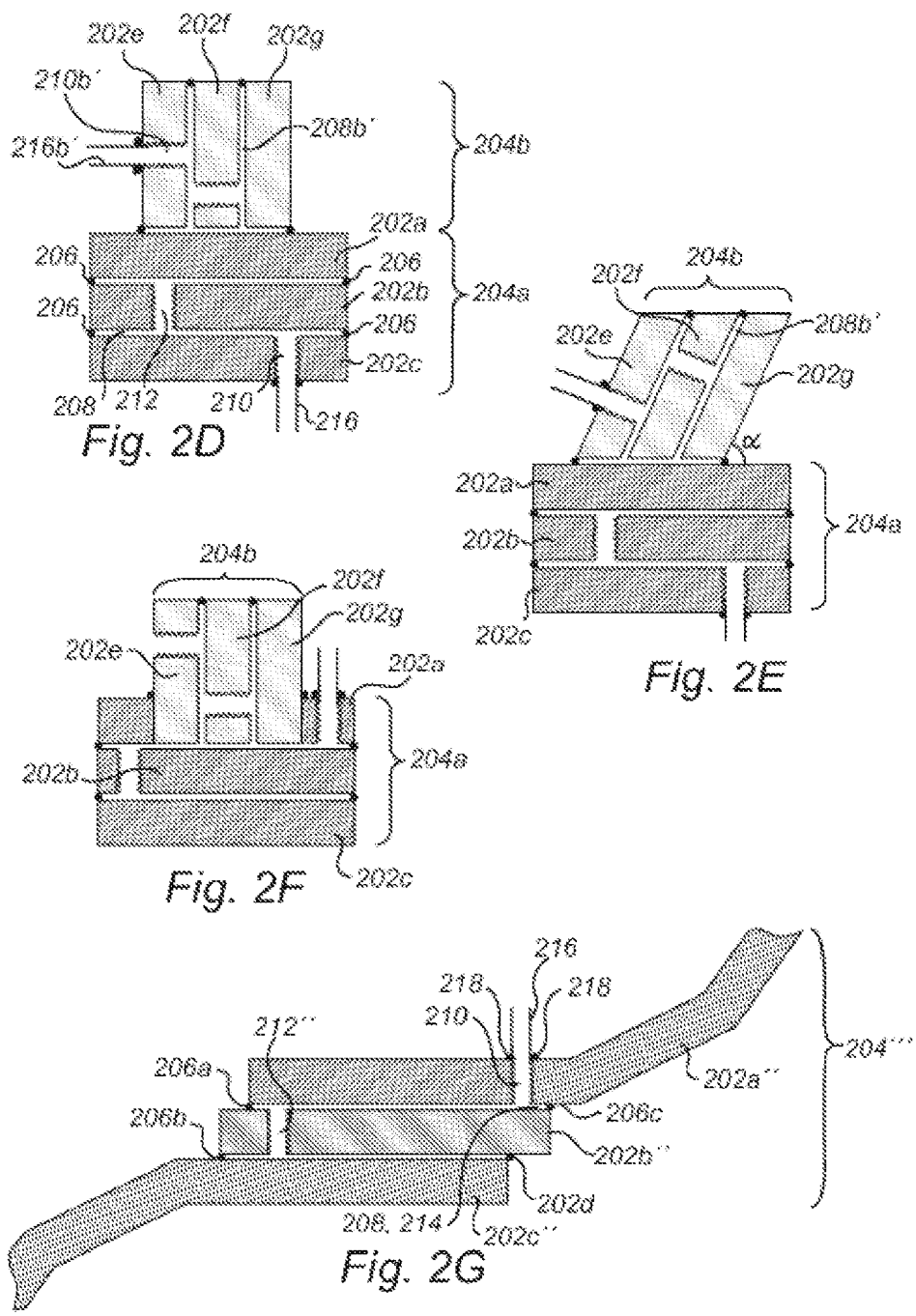

METHOD FOR MANUFACTURING A METAL BASED COMPONENT AND A SINGLE-PIECE, METAL BASED COMPONENT

This patent application is a U.S. national stage filing under 35 U.S.C. § 371 of PCT International Application No. PCT/EP2018/078113 filed Oct. 15, 2018 (published as WO2019/073085 on Apr. 18, 2019), which claims priority to and the benefit of European Application No. 17196414.1 filed Oct. 13, 2017. The entire contents of these applications are incorporated herein by reference.

TECHNICAL FIELD OF THE INVENTION

The present invention relates to a method for manufacturing a metal based component, and to a single-piece metal based component.

BACKGROUND OF THE INVENTION

Metal based components can be used in various applications and the size and/or composition of such components typically vary a lot between the different applications. The cost and time for producing a metal based component is often of great interest.

Hot isostatic pressing (abbreviated HIPping) can be used for producing or manufacturing metal based components. Typically, a can is used in the process, which can is filled with a metal powder which is HIPped to form the metal based component. Under high temperature and isostatic pressure, the powder is consolidated to a component. Further, HIPping may be used in order to reduce porosity and thereby increase the density of e.g. pre-sintered ceramic products.

Metal powder typically consist of a solid fraction of 60% and a void fraction of 40%. Hence, when HIPping metal powder, the void fraction will contribute to a substantial shape change during metallurgically bonding of the solid particles of the powder together. This shape change may be problematic during the HIPping process as it may result in bursting welds of the cans, but it may also be problematic subsequent to the HIPping process as it may require additional post-treatments of the product in order to shape the product into its final form.

In addition, using powder as the starting material may be problematic due to health aspects. Metal powders typically comprises particles of metal which may be in the nano- and/or microscale which may easily be inhaled by the person or persons producing the metal based components. Powder is also associated with a high cost and a large total surface area, the latter being problematic e.g. due that the large surface can be subject to the formation of oxide layers.

On way to solve the problem with powder is to use layers instead. WO 2013/037945 A1 shows an impeller vane and a method for producing such impeller vane using such layers. The method comprises the step of HIPping alternating layers of a metallic core material and a wear resistant material.

At least one problem with the cited prior art is how to sufficiently remove air in between the alternating layers. This is typically done by evacuating the can prior to the HIPping process. The can used in the process is rather expensive to produce and it can often only be used once, since the can typically has to be machined away from the resulting metal based component.

Therefore, there is a need to improve the current state of the art in order to overcome the above mentioned problem as well as other problems.

SUMMARY OF THE INVENTION

It is an object of the present invention to improve the current state of the art and to mitigate at least some of the above mentioned problems. These and other objects are achieved by a method for manufacturing a solid metal based component according to the accompanying independent claims.

According to a first aspect of the invention a method for manufacturing a solid metal based component is provided. The method comprises the steps of:
providing a plurality of metal based sheets;
arranging said plurality of metal based sheets in a stack, wherein said stack comprises a first metal based sheet, a last metal based sheet and at least one intermediate metal based sheet;
perimetrically sealing at least a portion of said stack forming at least one cavity inside of said stack;
removing gas from said at least one cavity;
subjecting said stack to a hot isostatic pressing process for a predetermined time at a predetermined pressure and a predetermined temperature so that the plurality of metal based sheets of said stack bond metallurgically to each other to form a solid metal based component.

The present invention is based on the realization that the high pressure isostatic pressing (HIPping) process may be made without a can or canister. Hence, and according to at least one example embodiment, the method according to the invention may be referred to as a can-less, HIPping method for manufacturing a solid metal based component. That is, the HIPping process step of the method is performed can-less. Hence, there is no need for providing or manufacturing a can prior to carrying out the method of the invention, and the step of e.g. machining away the can from the metal based product can be omitted.

Further, by the provision of a method for manufacturing a solid metal based component using a plurality of metal based sheets, the drawbacks of using powder as a starting material for the manufacturing method are avoided or overcome. Hence, the method according to the invention may be described as a metal powder-free HIPping manufacturing method. By using a plurality of metal based sheets, a relatively cheap manufacturing method, while still allowing the formation of a relatively complex form of the solid metal based component, is provided.

It should be understood that the at least one cavity is in fluid communication with surfaces, such as internally arranged surfaces, of the metal based sheets in the stack. Hereby, gas, typically air, can be removed from the stack and from the relatively small gap between two facing surfaces of two neighboring or adjacent metal based sheets, thus providing a vacuum, or a partial vacuum, between the metal based sheets. Hereby, the metallurgically bonding of the metal based sheet is improved. Hence, the problems associated with using powder, such as e.g. the large total surface area associated with the powder, can be mitigated.

It should further be understood that the at least one cavity is closed during the step of subjecting said stack to a hot isostatic pressing process for a predetermined time at a predetermined pressure and a predetermined temperature so that the plurality of metal based sheets of said stack bond metallurgically to each other to form a solid metal based component. During this step, adjacent metal sheets bond to each other to form a solid metal component without any cavities.

In the present disclosure, the term "solid metal based component" denotes a metal based component that is cavity free and preferably non-porous, i.e. it is not hollow or does not contain gaps or cavities. A component is solid if it has a compact interior space (that is cavity free and preferably non-porous, i.e. it is not hollow or does not contain gaps or cavities) enclosed by the outer surface of the component. Thus, e.g. solid torus is denoted as a solid component in the terms of the present disclosure.

It should be understood that the terms like "at least one of the plurality of metal based sheets" is a short version of at least one metal based sheet in the plurality of metal based sheets. Moreover, throughout the text a metal based sheet may be referred to without specifying that it is a part of the plurality of metal based sheets, however such metal based sheet should be interpreted as belonging to the plurality of metal based sheets.

According to at least one example embodiment, in said step of removing gas from said at least one cavity, at least 50%, or at least 60%, or at least 70%, or at least 80, or at least 90% of the gas is removed from said at least one cavity compared to prior to the step of removing gas from said at least one cavity. In other words, said step of removing gas from said at least one cavity, may comprise providing a vacuum, or a partial vacuum, in said at least one cavity. Stated differently, said step of removing gas from said at least one cavity, may comprise providing an under-pressure in said at least one cavity.

It may be understood that the metal based component may for example be a cog wheel, a tubular collar (e.g. a j-lay collar), a flange, a shaft, a bulk-head or the like. According to at least one example embodiment, the metal based component may be a propeller or an impeller vane.

An advantage with the method as described in here is that the metal based component after the HIPping process step has a near-net shape, i.e. the shape of the manufactured metal based component after the HIPping process step is the same, or almost, or sufficiently the same as the desired shape of the final metal based component. Hence, post-treatment of the metal based component related to re-shaping can be omitted or at least reduced compared to prior art methods.

It should be understood that a metal based component is a component comprising metal. The metal based component may for example be made solely of metal, or it may be made from a mixture of metal and another type of material. According to at least one example embodiment of the invention, the metal based component comprises mainly metal. For example, it may comprise at least 51%, or at least 80%, or at least 90%, or at least 95%, or at least 100% metal. According to at least one example embodiment, at least one of, such as e.g. each one of, the plurality of metal based sheets comprises at least 51%, or at least 80%, or at least 90%, or at least 95%, or at least 100% metal.

According to at least one example embodiment of the invention, at least one metal based sheet in said plurality of metal based sheets comprises stainless steel, superduplex steel, titanium, aluminum, bronze, nickel, precious metals e.g. gold or platinum, beryllium, zirconium, cobalt, nitinol, invar or magnesium or alloys and/or combinations thereof.

For example, a majority, such as e.g. all of the metal based sheets in the plurality of metal based sheets each comprise stainless steel, superduplex steel, titanium, aluminum, bronze, nickel, precious metals e.g. gold or platinum, beryllium, zirconium, cobalt, nitinol, invar or magnesium or alloys and/or combinations thereof.

According to at least one example embodiment of the invention, the material composition of one metal based sheet in the plurality of metal based sheets is different compared to the material composition of another metal based sheet in the plurality of metal based sheets. For example, the two metal based sheets may be made of different metals.

According to at least one example embodiment of the invention, the material composition of a portion of the metal based component is different compared to the material composition of another portion of the metal based component. For example, the two different portions may be made of different metals. According to one example embodiment, said metal based component is a propeller, with an interior material of relatively low cost, e.g. made of steel, and an outer material, e.g. on the surface of the propeller, of a relatively high cost, e.g. made of bronze. Hence the desired properties of the metal based component can be varied based on where the materials are used.

According to at least one example embodiment of the invention the shape and the size of the metal based sheets is the same, or substantially the same. According to at least one alternative embodiment, the metal based sheets have different shapes and/or sizes. For example, at least two of the metal based sheets in the plurality of metal based sheets have a different shape and/or size compared to each other. The first and the second size may differ by at least 5%, such as by at least 10%, preferably at least 15%

According to at least one example embodiment of the invention, at least one metal based sheet has the shape of a square, a rectangle, a circle, a triangle, a polygon, a ring, or any other regular or irregular shape. Further, in relation to this invention the term shape relates to the contour of the object irrespective of its size, so two circles have the same shape irrespective of their diameter. Two objects having different sizes may differ in surface area and/or thickness; i.e. in surface area and/or volume.

According to at least one example embodiment of the invention, at least one metal based sheet in said plurality of metal based sheets has a thickness between 1 mm and 200 mm, or between 5 mm and 50 mm. Additionally, or alternatively, a majority of, such as e.g. all of the metal based sheets in the plurality of metal based sheets, each has a thickness of between 1 mm and 200 mm, or between 5 mm and 50 mm.

It should be understood that the term metal based sheet may be interpreted as a metal based layer, or a metal based plate, or a metal based foil. The term sheet is here to be understood as an object having at least one extension, such as an extension in a plane, which is perpendicular to the thickness of the sheet, which at least one extension is greater than the thickness.

According to at least one example embodiment of the invention, the thickness of one of the plurality of metal based sheets is homogenous over the sheet. According to at least one alternative embodiment of the invention the thickness varies along at least one extension of at least one of the plurality of metal based sheets. For example, at least one of the plurality of metal based sheets has the form of a wedge. According to at least one example embodiment, at least one of the plurality of metal based sheet is non-planar, e.g. has a curved form. For example, the top surface and/or the bottom surface of at least one of the plurality of metal based sheets may be shaped as a wave, i.e. be wave formed, or the top surface and/or the bottom surface may be shaped as a bowl.

According to at least one example embodiment, different metal based sheets in the plurality of metal based sheets have different thickness. According to at least one example embodiment.

According to at least one example embodiment, during the step of arranging the metal based sheets in a stack, the plurality of metal based sheets may be arranged in a vertical matter, a horizontal matter and/or in a tilted matter. According to at least one example embodiment, the plurality of metal based sheets is arranged in a combined vertical and horizontal matter, i.e. the stack comprises stack portions having different vertical and horizontal stacking. That is, at least some metal based sheets are arranged in a vertical matter, e.g. in a vertically arranged stack portion, and at least some metal based sheets are arranged in a horizontal matter, e.g. in a horizontally arranged stack portion. According to at least one example embodiment, at least a respective stack portion of the vertically arranged metal based sheets is integrated, or submerged, or embedded in at least one of the horizontally arranged metal based sheets.

According to at least one example embodiment of the invention, said step of perimetrically sealing at least a portion of said stack is done by welding, vacuum brazing, metal brazing, MIG welding, TIG welding, electron beam welding and/or thermitic welding.

It should be understood that perimetrically sealing at least one portion of said stack for example means that an edge of one metal based sheet of the plurality of metal based sheets is sealed to an edge of another metal based sheet of the plurality of said metal based sheets or that an edge of one metal based sheet of the plurality of metal based sheets is sealed to a surface, such as e.g. a top surface portion or a bottom surface portion, of another metal based sheet of said plurality of metal based sheets. Stated differently, each one of the metal based sheets of the plurality of metal based sheets comprises a top portion (such as e.g. a top surface portion), a bottom portion (such as e.g. a bottom surface portion) and at least one edge portion, which is a lateral portion extending between the top portion and the bottom portion (i.e. which corresponds to the thickness of the respective metal based sheet). According to one example embodiment, during the step of perimetrically sealing at least a portion of said stack, at least at portion of the edge portion of one metal based sheet of said plurality of metal based sheets is sealed to at least another edge portion or a top portion or a bottom portion of another metal based sheet of said plurality of metal based sheets.

According to at least one example embodiment, the perimetrical seal extends over the entire edge portion for at least one of the metal based sheets.

Explained differently, two facing metal based sheets in the plurality of the metal based sheets form an interlayer interface when they are provided next to each other (i.e. adjacent to each other) in the stack. Such an interlayer interface may for example be between an edge or an edge portion, i.e. a lateral portion, of one of the two facing metal based sheets and an edge or an edge portion, i.e. a lateral portion of the other one of the two facing metal based sheets. Another example of an interlayer interface may for example be between an edge or an edge portion, i.e. a lateral portion, of one the two facing metal based sheets and surface, i.e. a top surface portion or a bottom surface portion, of the other one of the two facing metal based sheets. It should be understood that the above example with two facing metal based sheets by no way limits the scope of the invention, and any neighboring metal based sheets in the stack may be described as having an interlayer interface. According to at least one example embodiment, interlayer interfaces of said stack are sealed to form said at least one cavity inside said stack.

Explained yet differently, the stack, according to at least one example embodiment of the invention, comprises a bottom portion, a top portion and a lateral portion, wherein at least a portion of the lateral portion of the stack is sealed during the step of perimetrically sealing at least one portion of said stack. For example, the parts or portions of the stack, e.g. part and portions at the envelope of said stack, where two metal based sheets meet may be forming a part of the perimetrical seal.

According to at least one example embodiment of the invention, the stack comprises more than one intermediate metal based sheet. For example, the stack or stack portion may comprise two, three, four, five, six, seven, eight, nine, ten or more intermediate metal based sheets. That is, the plurality of metal based sheets may be comprised of two, three, four, five, six, seven, eight, nine, ten or more intermediate metal based sheets.

According to at least one example embodiment, said step of removing gas from said at least one cavity comprises the sub-steps of:
providing at least one gas evacuating aperture fluidly connected to said at least one cavity inside of said stack;
evacuating gas from said at least one cavity inside of said stack via said at least one gas evacuating aperture.

Hereby, gas may be removed from said at least one cavity in a relatively straightforward way. Thus, the at least one cavity is in fluid communication with surfaces, such as internally arranged surfaces, of the metal based sheets in the stack. Hereby, gas, typically air, can be evacuated from the stack. Hence, for such embodiments, the gas is removed from the at least one cavity to an outside of said stack by e.g. using a suction device connected to said at least one gas evacuating aperture.

According to at least one example embodiment of the invention, the shape of said at least one gas evacuating aperture is circular. Alternatively, the at least one gas escaping aperture may be elliptical or simply be described as having a round shape. The at least one gas evacuating may be described as a gas evacuating hole or as a gas evacuating opening. Yet alternatively, the gas escaping aperture may have the shape of a line, e.g. a groove or a slit, or it may have any regular or irregular form. According to one example embodiment, the gas evacuating aperture may have a predefined form.

According to at least one example embodiment, said step of removing gas from said at least one cavity comprises the sub-step of:
providing a chemical substance within said stack, said chemical substance being configured to react with said gas in said at least one cavity in order to remove said gas.

Hence, for such embodiments, the gas evacuating aperture can be omitted, as the gas within the at least one cavity reacts with said chemical substance in such a way that the gas is removed. It should be noted that the gas may thus be removed by a reaction with the chemical substance forming e.g. a solid material (i.e. not a gas), and/or be removed by absorption and trapping of the gas in the chemical substance.

The chemical substance may e.g. be held in said at least one cavity, such as e.g. in a separate portion of the at least one cavity, which separate portion later on can be removed (e.g. machined away) from the metal based component.

According to at least one example embodiment, said chemical substance is a Calcium based compound. For example, said chemical substance comprises at least one of the following substances: Ca, Ti, Zr, Ca—Mg, Ca—Al, Ca—Zn, Ca—Cu, any alloy of the same or any eutectic alloys.

According to at least one example embodiment, said chemical substance is molten, e.g. it may be comprised in a powder which subsequently melts during heating. According to at least one example embodiment, said chemical substance is configured to react with oxygen, nitrogen, hydrogen, water and/or a hydrocarbon.

According to at least one example embodiment, the method comprises the step of heating said chemical substance in order to make it react with said gas in said at least one cavity. The amount of heating needed is dependent on the chosen chemical substance which is well known to the person skilled in the art.

According to at least one example embodiment, the step of heating said chemical substance is comprised in said step of subjecting said stack to a hot isostatic pressing process (i.e. the HIPping process step). Hence, according to such embodiments, the chemical substance will be heated during the initial time of the HIPping process step.

Stated differently, and according to one example embodiment, the step of removing said gas from said at least one cavity is a sub-step in said step of subjecting said stack to a hot isostatic pressing process.

According to at least one example embodiment of the invention, the predetermined time, the predetermined pressure and the predetermined temperature used during high isostatic pressing is within the ranges of what is normally used within the HIPping industry. For example, the predetermined time may be within the range of 1 h to 12 h, the predetermined pressure may be within the range of 100 MPa to 200 MPa, and the predetermined temperature may be within the range of 500° C. to 1300° C. The predetermined time, the predetermined pressure and the predetermined temperature may all vary due to a variety of parameters. For example, they may vary due to the size or the shape of the metal based component which is being manufactured. Further, they may vary due to the material choice, e.g. which metal is being used.

Thus, each one of the plurality of metal based sheets may bond metallurgically to at least another one of said plurality of metal based sheets. In particular, as each one of the plurality of metal based sheets bond metallurgically to at least another one of said metal based sheets, the at least one cavity present between at least two of the sheets collapses inward and the gap between the sheets is closed.

It should be understood that during the HIPping process, the plurality of metal based sheets bonds to each other metallurgically. More specifically, the metal based sheets bonds to each other metallurgically in a multiaxial matter due to the isostatic pressing. This is different from uniaxial metallurgical bonding as achieved with e.g. uniaxial diffusion bonding.

According to at least one example embodiment of the invention, the metal based component is a single-piece metal based component. Thus, during the step of subjecting said stack to a hot isostatic pressure process, the plurality of metal based sheet bond metallurgically to each other and thereby form a single-piece metal based component.

According to at least one example embodiment of the invention, said stack provides a passage at least partly defined by a surface of said at least one intermediate metal based sheet, such that said at least one cavity is fluidly connected to said first metal based sheet, and is fluidly connected to said last metal based sheet. The size of the passage is small so that the passage is closed during the step of subjecting said stack to a hot isostatic pressing process for a predetermined time at a predetermined pressure and a predetermined temperature so that the plurality of metal based sheets of said stack bond metallurgically to each other to form a solid metal based component.

Thus, the at least one cavity may be a common cavity or a single cavity of said stack, and e.g. only one gas evacuating aperture may be needed to evacuate gas from said stack or, the chemical substance needs only to be placed in (or in contact with) said common cavity in order to react with said gas.

For example, the passage may be provided such that an inner surface of said first metal based sheet is fluidly connected to an inner surface of said last metal based sheet. Moreover, the surface of the at least one intermediate metal based sheet may be an internal facing surface (e.g. provided in an opening of the at least one metal based sheet) or an external facing surface.

According to at least one example embodiment, said passage is an opening, such as e.g. a hole, in said at least one intermediate metal based sheet, or said stack comprises at least two intermediate metal based sheets arranged side by side, and wherein said passage is a gap between said at least two intermediate metal based sheets.

In other words, the at least one intermediate metal based sheet may comprise at least one opening such that said at least one cavity is formed between said first metal based sheet and said last metal based sheet, or the stack may comprise at least two side-by-side arranged intermediate metal based sheet having no openings, but instead being separated by a gap or a passage. The at least one cavity is then a common cavity of the metal based sheets in the stack, or as mentioned above, it may be referred to as a single cavity of the stack.

The method may comprise the step of providing at least one opening in said at least one intermediate metal based sheet. The opening is preferably pre-made, i.e. the opening has been formed before the metal based sheets have been arranged in a stack. Alternatively, or additionality, the method comprises the step of arranging two intermediate metal based sheets side-by-side such that said two intermediate metal based sheets are separated by a gap, inside of said stack.

According to at least one example embodiment the stack may comprise more than one intermediate metal based sheets comprising an opening. Each one, or at least some of the additional intermediate metal based sheets may comprise at least one opening, thereby providing the possibility to form a common cavity (e.g. a single cavity) between said first metal based sheet and said last metal based sheet. Alternatively, or additionality, the stack may comprise at least one pair of side-by-side arranged intermediate metal based sheets separated by a gap for providing said passage. According to at least one example embodiment, the stack comprises a combination of intermediate metal based sheet(s) comprising an opening, and pairs of side-by-side arranged intermediate metal based sheets separated by a gap, thereby providing the possibility to form a common cavity within said stack.

Stated differently, and according to at least one example embodiment, in which the stack of said plurality of metal based sheets comprises more than one intermediate metal based sheet, at least some of the metal based sheet may comprise a respective opening arranged to form a common cavity in said stack, and/or the stack may comprise at least two intermediate metal based sheets, wherein said at least two intermediate metal based sheets are arranged such that a passage is formed between said at least two intermediate metal based sheets and such that said passage allows for forming a common cavity within the stack. Thus, such intermediate metal based sheets need not to be provided with an opening in order to form a common cavity within the stack. For example, said at least two intermediate metal based sheets may be arranged on the same vertical level (in a horizontally arranged portion of the stack), or on the same horizontal level (in a vertically arranged portion of the stack). Thus, the at least two intermediate metal based sheets may be arranged side-by-side as described previously, thereby forming a passage e.g. in the gap which is formed between the two intermediate metal based sheets.

According to at least one example embodiment of the invention, the shape of said opening in said at least one intermediate metal based sheet is spherical. Alternatively, the opening in said at least one intermediate metal based sheet is elliptical. Yet alternatively, the opening in said intermediate metal based sheet is shaped as a line, e.g. a groove or a slit, or it may have any irregular form.

According to at least one example embodiment of the invention, said at least one cavity is a first cavity within said stack, and wherein said method further comprises the steps of:
providing a second cavity within said stack,
removing gas from said second cavity inside of said stack.

The step of removing gas from said second cavity inside of said stack may be performed in a similar manner as the step of removing gas from said at least one cavity (i.e. said first cavity) described above. That is, the stack may be provided with a second gas evacuating aperture in fluid communication with said second cavity, or said second cavity may be provided with a chemical substance configured to react with said gas in order to remove said gas from said second cavity. Thus, effects and features of this removing gas from said second cavity, are largely analogous to those described above in connection removing gas from said at least one cavity (i.e. said first cavity). Embodiments mentioned in relation to removing gas from said at least one cavity (i.e. said first cavity) are largely compatible with removing gas from said second cavity.

For example, in said step of removing gas from said second cavity, at least 50%, or at least 60%, or at least 70%, or at least 80, or at least 90% of the gas is removed from said second cavity compared to prior to the step of removing gas from said second cavity. In other words, said step of removing gas from said second cavity, may comprise providing a vacuum, or a partial vacuum, in said second cavity. Stated differently, said step of removing gas from said second cavity, may comprise providing an under-pressure in said second cavity.

According to the example embodiments comprising a gas evacuating aperture, and said at least one gas evacuating aperture is a first gas evacuating aperture, and wherein said method further comprises the steps of:
providing a second gas evacuating aperture fluidly connected to said second cavity,
evacuating gas from said second cavity inside of said stack via said second gas evacuating aperture.

According to at least one example embodiment, said first cavity is formed between said first metal based sheet and said intermediate metal based sheet and/or said second cavity is formed between said last metal based sheet and said intermediate metal based sheet.

It should be understood that the first cavity and second cavity are different cavities, i.e. that they are not in fluid connection with each other. However, the first cavity and the second cavity may, but do not need to, have different sizes and/or shapes. According to one example embodiment, the size and/or the shape of the first cavity is the same to the corresponding size and/or shape of the second cavity is different.

Additionally, or alternatively, further cavities may be provided within said stack if the stack comprises more than one intermediate metal based sheet. For example, a third and a fourth cavity, or any number of cavities may be provided within the stack. Correspondingly, the stack may further comprise corresponding gas evacuating aperture(s), or the stack may be provided with a chemical substance configured to react with said gas in the respective cavity in order to remove said gas. The method may thus further comprise the step of evacuating said third, said fourth, or any number of cavity, via the corresponding gas evacuating aperture, or the method may comprise the step of providing a chemical substance within said stack, said chemical substance being configured to react with said gas in the respective cavity in order to remove said gas. The different (i.e. fluidly separated) cavities may e.g. be separated by an intermediate metal based sheet having no opening.

According to at least one example embodiment of the invention, said at least one gas evacuating aperture is arranged in the envelope of said stack, e.g. in said first metal based sheet and/or said last metal based sheet.

The envelope of the stack should be interpreted as the outer facing surfaces of said stack. The at least one gas evacuating aperture may e.g. be an opening in one of the plurality of metal based sheets, e.g. the first metal based sheet or the last metal based sheet.

According to at least one example embodiment of the invention, said second gas evacuating aperture is, or any gas evacuating aperture provided in the stack are, arranged in the envelope of said stack, e.g. in said first metal based sheet and/or said last metal based sheet.

According to at least one example embodiment of the invention, said at least one opening in one of the plurality of metal based sheets is prepared by removing a portion of the metal based sheet in the size of a hole, e.g. by cutting away said portion, drilling or stamping through the metal based sheet, or by any other means. In other words, an opening or a hole may be formed in one of the plurality of metal based sheets in order to provide the at least one gas evacuating aperture.

According to at least one example embodiment of the invention, any opening, e.g. the at least one gas evacuating aperture and/or an opening in an intermediate metal based sheet may be filled with metal based parts or opening fillings, e.g. metal based wires or beads. The metal based wires or beads allow for gas to be transported through the opening but prevents shrinkage of the opening during the HIPping process. Traces, or residues, of these metal based wires or beads may be detectable in the metal based component after the HIPping process.

According to at least an example embodiment of the invention, said at least one gas evacuating aperture is a hole or an opening in said perimetrical seal, which e.g. comprises a weld.

According to at least one example embodiment of the invention, the second gas evacuating aperture is at least one opening or hole in one of the plurality of metal based sheets, said opening or hole being arranged in the envelope of said stack, e.g. in said first metal based sheet and/or said last metal based sheet.

According to at least one example embodiment of the invention, said at least one gas evacuating aperture is a pre-made aperture.

It should be understood that a pre-made aperture is an aperture which has been provided prior to arranging the plurality of a metal based sheets in said stack. For example, the aperture may be made, e.g. drilled, in one of the plurality of metal based sheets prior to arranging the plurality of metal based sheets in said stack.

According to at least one example embodiment of the invention, said second gas evacuating aperture is a pre-made aperture.

According to at least one example embodiment of the invention a gas evacuating crimp tube is attached to said stack, wherein an opening of said gas evacuating crimp tube covers said at least one gas evacuating aperture; and wherein said method further comprises the step of sealing said gas evacuating crimp tube after the step of evacuating said gas from said at least one cavity inside of said stack but prior to the step of subjecting said stack to a hot isostatic pressing process.

It should be understood that the term cover here means that the diameter of the opening of the crimp tube, i.e. the inner diameter of the crimp tube, is larger than the corresponding size of the at least one gas evacuating aperture. In other words, the opening of the crimp tube surrounds the at least one gas evacuating aperture.

According to one example embodiment of the invention, any further gas evacuating aperture, such as e.g. said second gas evacuating aperture, is provided with a corresponding crimp tube that covers the related gas evacuating aperture.

Hence, any cavity within the stack in fluid connection with a corresponding gas evacuating aperture can be evacuated by the use of a corresponding crimp tube and related gas suction device.

According to at least one example embodiment of the invention, any crimp tube may be attached to the stack by welding or any other sealing method know to the man skilled in the art.

According to at least one example embodiment of the invention, the method comprises the step of surface treating and/or coating at least one metal based sheet in said plurality of metal based sheets.

Thus, at least one surface of at least one metal based sheet has been surface treated, and/or coated, prior to be subjected to the HIPping process step. The surface treatment may e.g. be grinding, lapping, polishing, and/or cleaning. It should be noted that the coating may according to at least one embodiment be considered to be comprised in general term of "surface treating". However, according to at least yet another embodiment, the coating may be considered to be the act of adding a layer to the at least one metal based sheet, and hence not a treatment of the surface of the at least one metal based sheet per se.

Thus, according to at least one example embodiment of the invention, the method further comprises the step of:

grinding, lapping, polishing, cleaning and/or coating at least one surface of at least one of said plurality of metal based sheets.

Grinding, lapping, polishing, cleaning and/or coating of at least one surface of at least one of said plurality of metal based sheets is done in order to ensure, or at least improve, metallurgical bonding during the HIPping process step. During grinding, lapping, polishing, cleaning and/or coating step, dirt and/or oxides may be removed from said at least one surface, and/or the properties of the at least one surface may be altered, of at least one of the plurality of metal based sheets. Hereby, direct contact between two facing surfaces of two neighboring metal based sheets may be improved.

According to at least one example embodiment, the choice between the techniques grinding, lapping, polishing, cleaning and/or coating is material dependent. In other words, depending on which metal that is used in the plurality of metal based sheets, different techniques or different combination of techniques may be used. For example, for a for a certain kind of metal, only cleaning may be needed or preferred, whereas for another kind of metal, cleaning, polishing and/or coating may be needed, or preferred, in order to ensure, or improve, metallurgical bonding during the HIPping process step.

According to at least one example embodiment of the invention, when coating is performed, traces or residues of the coating may be visible in the final, or manufactured, metal based component, and therefore the coating may act as a finger print for the method when used.

According to at least one example embodiment of the invention, during the HIPping process, each one of the plurality of metal based sheets is subjected to lateral shearing. The lateral shearing may act as a surface treatment of at least one surface of at least one of the metal based sheets, which surface treatment ensures for the metallurgical bonding between the metal base sheets.

According to at least one example embodiment of the invention, said method further comprises:

shaping at least one of said plurality of metal based sheets into a 2D shape, and/or forming at least one of said plurality of metal based sheets into a 3D geometry.

For example, a metal based sheet may be cut into a 2D shape, and/or a metal based sheet may be formed into a 3D geometry.

Stated differently, and according to at least one example embodiment of the invention, the method comprises:

forming at least one of said plurality of metal based sheets into a 2D and/or 3D shape by e.g. incremental forming, bending and/or cutting.

Shaping at least one of said plurality of metal based sheets into a 2D shape may include cutting of the at least one of said plurality of metal based sheets into a desired 2D shape, i.e. the at least one of said plurality of metal based sheets is a planar sheet. Forming at least one of said plurality of metal based sheets into a 3D geometry may include incremental forming or bending of said sheet into a desired 3D shape or form, i.e. the at least one of said plurality of metal based sheets may be a bended sheet.

According to one example embodiment, said shaping or forming at least one of said plurality of metal based sheets may be performed by bending or cutting said at least one metal based sheet along at least one predetermined line.

According to at least one example embodiment of the invention, said predetermined line is a geometrical line extending along the surface of said at least one metal based sheet.

According to at least one example embodiment of the invention, said predetermined line is an imaginary line, or a drawn line, or a groove, or a cut.

According to at least one example embodiment of the invention, said step of forming at least one of said plurality of metal based sheets is performed prior to the step of arranging said plurality of metal based sheets in a stack.

According to at least one example embodiment of the invention, said step of forming at least one of said plurality of metal based sheets comprises the step of said at least one metal based sheet being bent in a first direction along a plurality of first lines, wherein each first line originates from a first origin edge portion and extends over said metal based sheet to a respective edge portion distant from said first origin edge portion. Stated differently, wherein in said step of forming at least one of said plurality of metal based sheets, said at least one of said plurality of metal based sheets is bent in a first direction along a first set of predetermined lines which extends over the surface of the at least one metal based sheet.

According to at least one example embodiment of the invention, wherein in said step of forming at least one of said plurality of metal based sheets, said metal based sheet is further bent in a second direction different from said first direction along a plurality of second lines, wherein each second line originates from a second origin edge portion and extends over said metal based sheet to a respective edge portion distant from said second origin edge portion. Stated differently, wherein in said step of forming at least one of said plurality of metal based sheets, said at least one of said plurality of metal based sheets is bent in a second direction along a second set of predetermined lines extending radially from each other.

According to at least one example embodiment of the invention, wherein said step of forming at least one of said plurality of metal based sheets results in that said at least one metal based sheet comprises a helicoidal surface. The helicoidal surface may e.g. be comprised in a propeller.

According to at least one example embodiment, the method further comprises the step of:
 providing a pre-existing metal based component
 creating at least one smooth surface on said pre-existing metal based component;
 wherein said step of arranging said plurality of metal based sheets in a stack comprises forming said stack to include said smooth surface in such way that one of said first metal based sheet or said last metal based sheet is adjacent, or in contact with, said at least one smooth surface.

Hereby, the pre-existing metal based component can be built upon, or repaired, by the method as previously described. Thus, it should be understood that the stack comprises the smooth surface of the pre-existing metal based component, and at least the first metal based sheet, the last metal based sheet and the least one intermediate metal based sheet.

Alternatively, the method comprises the step of arranging said stack of at least the first metal based sheet, the last metal based sheet and the least one intermediate metal based sheet on said smooth surface, and further
 perimetrically sealing said stack to said at least one smooth surface thereby forming at least one intermediate cavity between said smooth surface and said first metal based sheet or said last metal based sheet;
 removing gas from said at least one intermediate cavity, e.g. by
  providing at least one intermediate gas evacuating aperture fluidly connected to said at least one intermediate cavity;
  evacuating gas from said at least one intermediate cavity via said at least one intermediate gas evacuating aperture; or by:
  providing a chemical substance within said stack, said chemical substance being configured to react with said gas in said at least one intermediate cavity in order to remove said gas;
 subjecting said stack and said pre-existing metal based component to a hot isostatic pressing process for a predetermined time at a predetermined pressure and a predetermined temperature so that said stack and said smooth surface bond metallurgically to each other.

Stated differently, according to a second aspect of the invention, a method to repair, or to build upon, a pre-existing metal based component is provided. The method comprises the steps of:
 creating at least one smooth surface on said pre-existing metal based component;
 providing at least one metal based sheet or a metal based piece in close proximity to said smooth surface;
 perimetrically sealing said at least one metal based sheet or said metal based piece to said at least one smooth surface forming at least one intermediate cavity between said smooth surface and said at least one metal based sheet, or between said smooth surface and said metal based piece;
 removing gas from said at least one intermediate cavity, e.g. by
  providing at least one intermediate gas evacuating aperture fluidly connected to said at least one intermediate cavity;
  evacuating gas from said at least one intermediate cavity via said at least one intermediate gas evacuating aperture; or by:
  providing a chemical substance within said stack, said chemical substance being configured to react with said gas in said at least one intermediate cavity in order to remove said gas;
 subjecting said metal based component and said at least one metal based sheet or metal based piece to a hot isostatic pressing process for a predetermined time at a predetermined pressure and a predetermined temperature so that said at least one metal based sheet or metal based piece bond metallurgically to said pre-existing metal based component.

Effects and features of this second aspect of the present invention are largely analogous to those described above in connection with the first aspect of the inventive concept. Embodiments mentioned in relation to the first aspect of the present invention are largely compatible with the second aspect of the invention.

Hence, by the provision of providing at least one metal based sheet of a metal based piece to be metallurgically bonded to the smooth surface of the pre-existing metal based component, the pre-existing metal based component can be repaired, or built upon, layer by layer (by using metal based sheets) or by using a pre-fabricated metal based pieces (e.g. the metal based piece may be manufactured according to the first aspect of the invention).

According to at least one example embodiment of the invention, the even or smooth surface may be a planar surface, or it may be a concave surface, or it may be a convex surface. It should be understood that an even or smooth surface should be interpreted as that the surface is substantially even or smooth such that metallurgical bonding upon HIPping can be ensured.

According to at least one example embodiment of the invention, said metal based piece is manufactured by the method according what has been described in connection with the first aspect of the invention.

According to a third aspect of the invention a single-piece, metal based component is provided. The single-piece, metal based component comprises a body formed by at least three metal based sheets arranged in stack wherein said at least three metal based sheets have been perimetrically sealed to each other; and wherein said one of said at least three metal based sheets has been metallurgically bonded to at least another one of said at least three sheets during the process of a hot isostatic pressing (HIPping) for a predetermined time at a predetermined pressure and a predetermined temperature.

Effects and features of this third aspect of the present invention are largely analogous to those described above in connection with the first and second aspects of the inventive concept. Embodiments mentioned in relation to the first and second aspects of the present invention are largely compatible with the third aspect of the invention.

According to at least one example embodiment of the invention, said single-piece metal based component comprises traces of former interfaces between two adjacent metal based sheets, wherein said traces are formed by crystallographic mismatch.

These traces stem/originate from the HIPping process. The former interface between two metal based sheets may be traced as it appears as a straight line, along which line metal grains is arranged. Hence, the term trace may be interpreted as the traceable formation of residues or residuals of the former interfaces. According to at least one example embodiment, at least one trace originates from said perimetrical seal being e.g. a weld.

According to at least one example embodiment of the invention, said metal based component comprises traces of former openings or former opening fillings e.g. wires, wherein said traces are formed by crystallographic mismatch.

Hence, the single-piece metal based component may be described as having been manufactured by providing at least one opening, which opening has been filled with opening fillings. These traces stem/originate from the HIPping process. For example, wires which has been used as opening fillings may be visible in the metal based component as a hexagonal trace.

Sheets, e.g. plates, layers or foils have different grain structure than other metal based products. Therefore, the grain structure inside of the metal based component may be different as compared to if the metal based component has been produced from another starting material.

According to at least one example embodiment of the invention the traces mentioned above is made visible through etching of a cross-sectional sample of the metal based component.

According to at least one example embodiment of the invention, said single-piece, metal based component comprises a portion being formed in a 3D geometry, such as e.g. a bent portion of at least one of said at least three metal based sheets.

According to at least one example embodiment of the invention said at least three metal sheets has been formed into a 2D shape and/or a 3D geometry by e.g. incremental forming, bending and/or cutting, which has been performed along at least one predetermined line.

According to a fourth aspect of the invention, a single-piece metal based component is provided. The single-piece metal based component is manufactured by the method according to the first aspect of the invention.

Effects and features of this forth aspect of the present invention are largely analogous to those described above in connection with the first, second and third aspects of the inventive concept. Embodiments mentioned in relation to the first, second and third aspects of the present invention are largely compatible with the forth aspect of the invention.

Thus, for example, and according to at least one example embodiment of the invention, said single-piece metal based component comprises traces of former interfaces between two adjacent metal based sheets, wherein said traces are formed by crystallographic mismatch.

For example, and according to at least one example embodiment of the invention, said metal based component comprises traces of former openings or former opening fillings e.g. wires, wherein said traces are formed by crystallographic mismatch.

For example, and according to at least one example embodiment of the invention the traces mentioned above is made visible through etching of a cross-sectional sample of the metal based component.

BRIEF DESCRIPTION OF THE DRAWINGS

The above objects, as well as additional objects, features and advantages of the present invention, will be more fully appreciated by reference to the following illustrative and non-limiting detailed description of embodiments of the present invention, when taken in conjunction with the accompanying drawings, wherein:

FIGS. 2A-G show schematic, cross-sectional views of a stack comprising a plurality of metal based sheets in accordance with at least some example embodiments of the invention;

DETAILED DESCRIPTION OF THE DRAWINGS

In the present detailed description, embodiments of the present invention will be discussed with reference to the accompanying figures. It should be noted that this by no means limits the scope of the invention, which is also applicable in other circumstances for instance with other types or variants of methods for manufacturing a metal based component encompassed by the scope of the claims, than the embodiments shown in the appended drawings. Further, that specific features are mentioned in connection to an embodiment of the invention does not mean that those features cannot be used to an advantage together with other embodiments of the invention.

Figure 1:
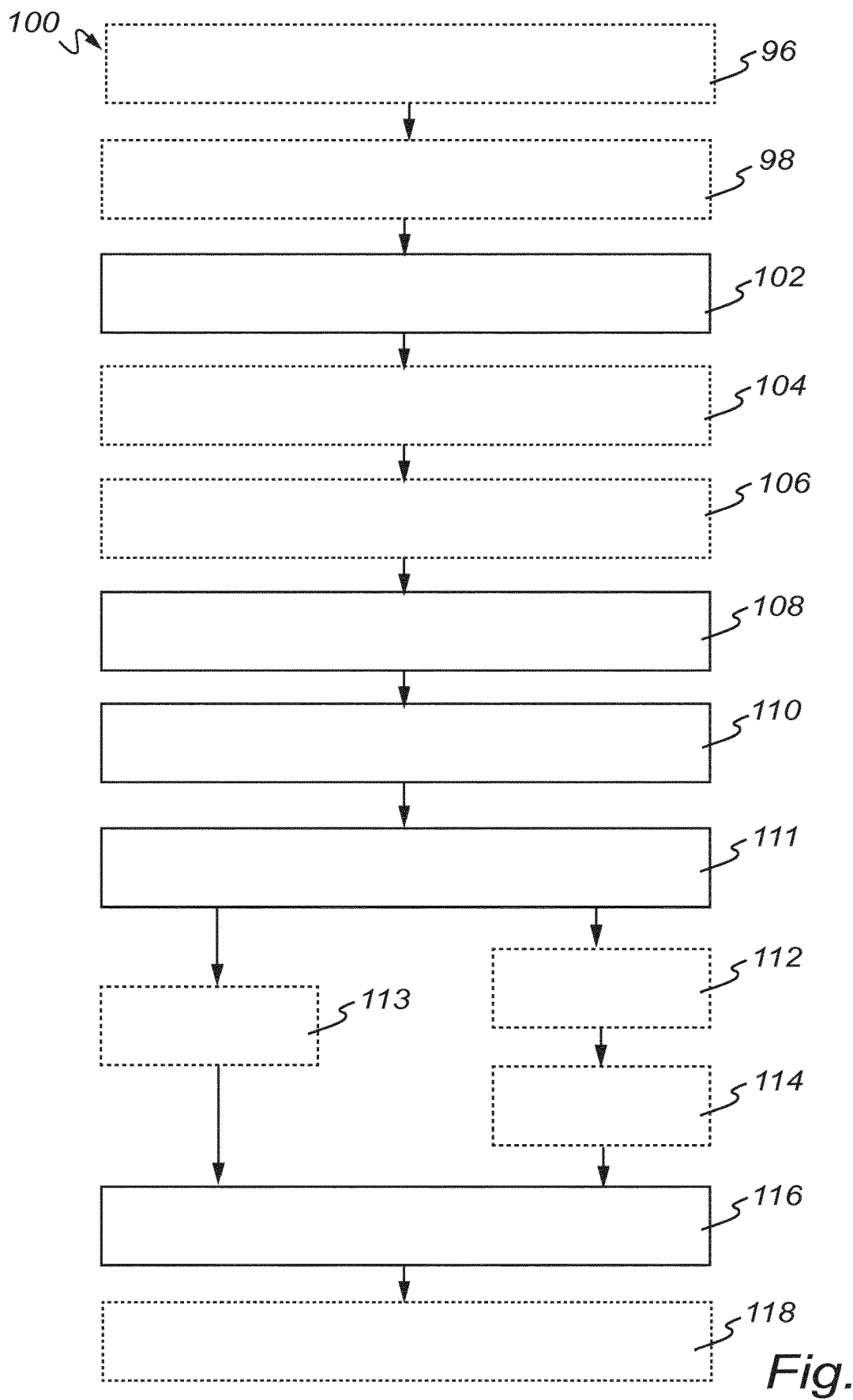
FIG. 1 shows a flow-sheet explaining the steps of a method in accordance with at least one embodiment of the invention.

FIG. 1 shows a flow-sheet describing the different steps of a method 100 for manufacturing a metal based component. The method 100 comprises the steps of: providing a plurality of metal based sheets 102, arranging said plurality of metal based sheets in a stack 108, perimetrically sealing at least a portion of said stack 110, removing gas from said at least one cavity 111, and subjecting said stack to a hot isostatic pressing process 116 (i.e. a HIPping process step). In FIG. 1, two optional routes are described for the step of removing gas from said at least one cavity 111, a first route comprising the optional steps of providing at least one gas evacuating aperture 112, and evacuating gas from said at least one cavity inside of said stack via said gas evacuating aperture 114, and a second route comprising the optional step of providing a chemical substance within said stack 113, said chemical substance being configured to react with said gas in said at least one cavity in order to remove said gas. The step of providing a chemical substance within said stack 113, may be followed by a step of heating the chemical substance in order to make it react with the gas in said at least one cavity (if this is required for the chemical substance used). However, the step of heating the chemical substance may be comprised in the step of subjecting said stack to a hot isostatic pressing process 116.

In the step of providing a plurality of metal based sheets 102, at least three metal based sheets is provided. These at least three metal based sheets are in the step of arranging the plurality of metal based sheets in a stack 108 arranged such that the stack comprises a first metal based sheet, a last metal based sheet and at least one intermediate metal based sheet. If in the step of providing a plurality of metal based sheets 102 more than three metal based sheets are provided, the stack may comprise more than one intermediate metal based sheets after the step of arranging the plurality of metal based sheets in a stack 108. The plurality of metal based sheets may in said step of arranging the metal based sheets in a stack 108 be arranged in e.g. a vertical, a horizontal, a combined vertical and horizontal (e.g. comprising at least a vertically arranged portion and a horizontally arranged portion) or a tilted stack.

In the step of perimetrically sealing at least one portion of said stack 110, the plurality of metal based sheets are attached to each other, e.g. by welding, in such way that at least one cavity is formed inside of said stack. At this point, this cavity comprises gas, typically air. According to at least one example embodiment, one or more cavities may be formed inside of said stack.

In the step of providing at least one gas evacuating aperture 112, said at least one gas evacuating aperture is fluidly connected to said at least one cavity inside of said stack. If there are more than one cavity, more than one gas evacuating aperture may be provided, such that each cavity within said stack is fluidly connected to at least one corresponding gas evacuating aperture, in the step of providing at least one gas evacuating aperture 112. It should be understood that a cavity within said stack may be fluidly connected to more than one gas evacuating aperture. The gas evacuating aperture may for example be an opening, or a hole in one of the metal based sheets, e.g. said first metal based sheet or said last metal based sheet. The opening or hole may be made, e.g. drilled, in the metal based sheet prior to the step of arranging said plurality of metal based sheets in a stack 108. Alternatively, the gas evacuating aperture may be provided in the perimetrical seal, e.g. in the weld, provided when perimetrically sealing at least one portion of said stack 110.

In the step of evacuating gas from said at least one cavity inside of said stack via said at least one gas evacuating aperture 114, said at least one cavity is emptied or almost emptied of gas, e.g. air, (in other words, a partial vacuum is created within the stack) in order to increase the contact between two facing surfaces of two neighboring, or adjacent, metal based sheets.

In the step of providing a chemical substance within said stack 113, the gas within the at least one cavity will react with said chemical substance in such a way that the gas is removed.

In the step of subjecting said stack to a hot isostatic pressing process 116 the stack is subjected to a hot isostatic pressing process for a predetermined time at a predetermined pressure and a predetermined temperature. During this hot isostatic pressing process the plurality of metal based sheets of said stack is bonded metallurgically to each other. The predetermined time, pressure and temperature may be within the ranges typically used within industrial hot isostatic pressing processes. The predetermined time may for example be in the range of 1 h to 12 h. The predetermined pressure may for example be in the range of 100 MPa to 200 MPa. The predetermined temperature may for example be in the range of 500° C. to 1300° C.

Further the method may comprise one or several optional steps. In FIG. 1 these optional steps are shown as dashed boxes. For example, the method may comprise a step or forming at least one of said plurality of metal based sheets 104. In FIG. 1 the step of forming at least one of said plurality of metal based sheets 104 occurs subsequent to the step providing a plurality of metal based sheets 102. In addition, the method 100 may comprise an optional step of surface treating at least one metal based sheet in said plurality of metal based sheets 106. The surface treating may e.g. comprise grinding, lapping, polishing, cleaning and/or coating (or coating may be a separate, or alternative step, to the step of surface treating). As shown in FIG. 1 this step may occur subsequent to the step of forming at least one of said plurality of metal based sheets 104 and before the step of arranging the plurality of metal based sheets in a stack 108. Another example of such an optional step is the step of treating, or post-treating ("post" referring to the HIPping process step, i.e. that it is occurring post, or after, the HIPping process step) the metal based component 118. The step of treating the metal based component may for example be done by a heat treatment of said metal based component and/or the step may comprise machining of said metal based component in order to achieve the final shape of the metal based component.

The method 100 may further comprise the steps of providing a pre-existing metal based component 96, and creating at least one smooth surface on said pre-existing metal based component 98. Moreover, for such embodiments, said step of arranging said plurality of metal based sheets in a stack 108 may comprise forming said stack to include said smooth surface in such way that one of said first metal based sheet or said last metal based sheet is adjacent, or in contact with, said at least one smooth surface.

Figure 2A:
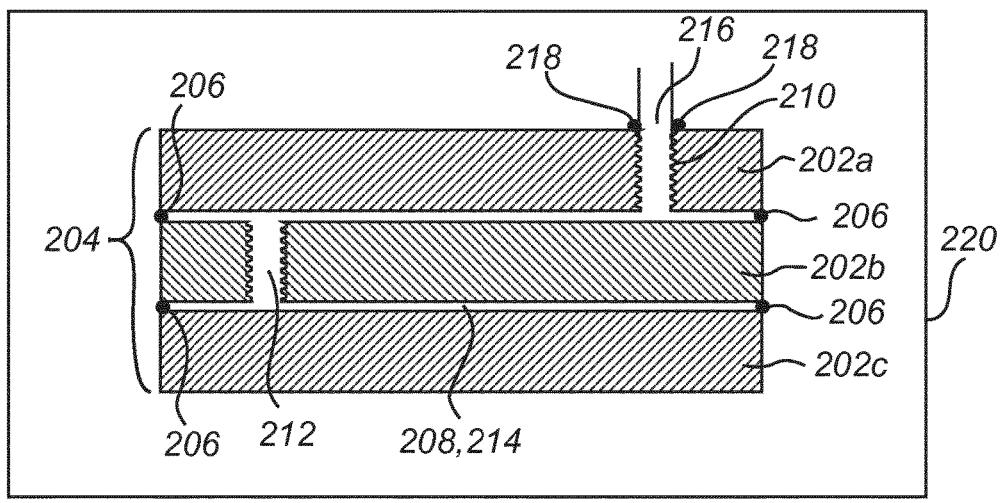

FIG. 2A shows a cross-section of a stack 204 of a plurality of metal based sheets 202*a*-*c*, which is arranged inside a hot isostatic pressing equipment 220 (the hot isostatic pressing equipment 220 is only shown in FIG. 2A, and has been removed for enhanced readability in the other figures). Here, each one of the plurality of metal based sheet 202*a*-*c* has a rectangular cross section. The stack comprises a first metal based sheet 202*a*, an intermediate metal based sheet 202*b* and a last metal based sheet 202*c*. The intermediate metal based sheet 202*b* comprises an opening 212. The stack is provided with a gas evacuating aperture 210 in the first metal based sheet 202*a*. A crimp tube 216 is attached to the stack 204 such that it covers said gas evacuating aperture 210. The crimp tube 216 is attached to said stack 204 by a weld 218, but it may as well be sealingly attached to the stack 204 by other means.

The stack 204 is a horizontal stack 204. In other words, the plurality of metal based sheets 202*a*-*c* is horizontally arranged. The stack 204 has been perimetrically sealed with welds 206. Here, the edges of plurality of metal based sheets 202*a*-*c* has been welded together forming the welds 206. The welds, together with the plurality of metal based sheets 202*a*-*c* forms a cavity 208, which is here a common cavity 214, or a single cavity 214, of the stack 204 since the opening 212 in said intermediate metal based sheet 202*b* fluidly connects the portion of the cavity 208 which is arranged in between the first metal based sheet 202*a* and the intermediate metal based sheet 202*b* and the portion of the cavity 208 which is arranged between the intermediate metal based sheet 202*b* and the last metal based sheet 202*c*.

Figure 2B:
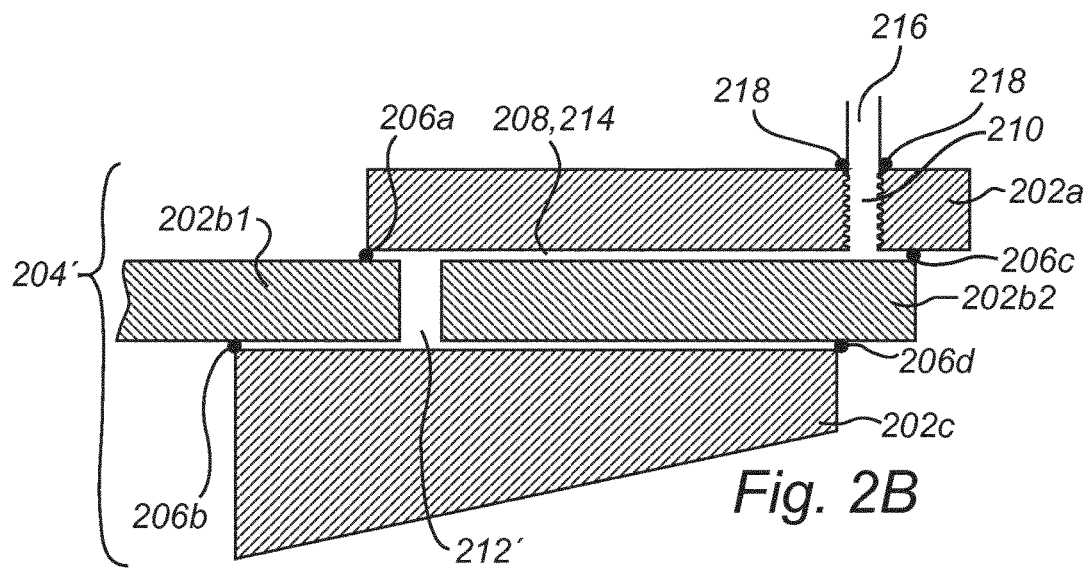

FIG. 2B shows a stack 204' with a plurality of metal based sheets 202*a*, 202*b*1, 202*b*2, 202*c* here a first metal based sheet 202*a*, a first intermediate metal based sheet 202*b*1, and a second intermediate metal based sheet 202*b*2, and a last metal based sheet 202*c*. Similar or identical features in FIG. 2B and FIG. 2A have been given the same reference numerals, and the description of such features are not described with reference to FIG. 2B again. For example, the first and the last metal based sheets 202*a*, 202*c* are in principal the same as the corresponding first and last metal based sheets 202*a*, 202*c* of FIG. 2A, with the slight difference that the last metal based sheet 202*c* in FIG. 2B is wedged-shaped (described further below). In FIG. 2B, the stack 204' is a tilted, horizontal stack as compared with the stack 204 in FIG. 2A which is a straight, horizontal stack 204. During the perimetrical sealing of the stack, an edge of the first metal based sheet 202*a* has been welded to a top portion, such as a top surface portion, of the first intermediate metal based sheet 202*b*1 with a first weld 206*a* and an edge of the first intermediate metal based sheet 202*b*1 has been welded to a top portion, such as a top surface portion, of the last metal based sheet 202*c* with a second weld 206*b*. Further, an edge of the last metal based sheet 202*c* has been welded to a bottom portion, such as a bottom surface portion, of the second intermediate metal based sheet 202*b*2 with a third weld 206*d* and an edge of the second intermediate metal based sheet 202*b*2 has been welded to a bottom portion, such as a bottom surface portion, of the first metal based sheet 202*a* with a fourth weld 206*c*.

In FIG. 2B, the first and the second intermediate metal based sheets 202*b*1, 202*b*2 are arranged side-by-side, and are separated by a gap or passage 212' thereby forming a common cavity 214 of said stack 204'.

Moreover, as can be seen in FIG. 2B, the last metal based sheet 202*c* has a varying thickness and is wedged-shaped. Thus at least one of the metal based sheets 202*c* in the plurality of metal based sheets 202*a*, 202*b*1, 202*b*2, 202*c*, has a thickness being different from at least one of the other metal based sheets in the stack 204'.

Figure 2C:
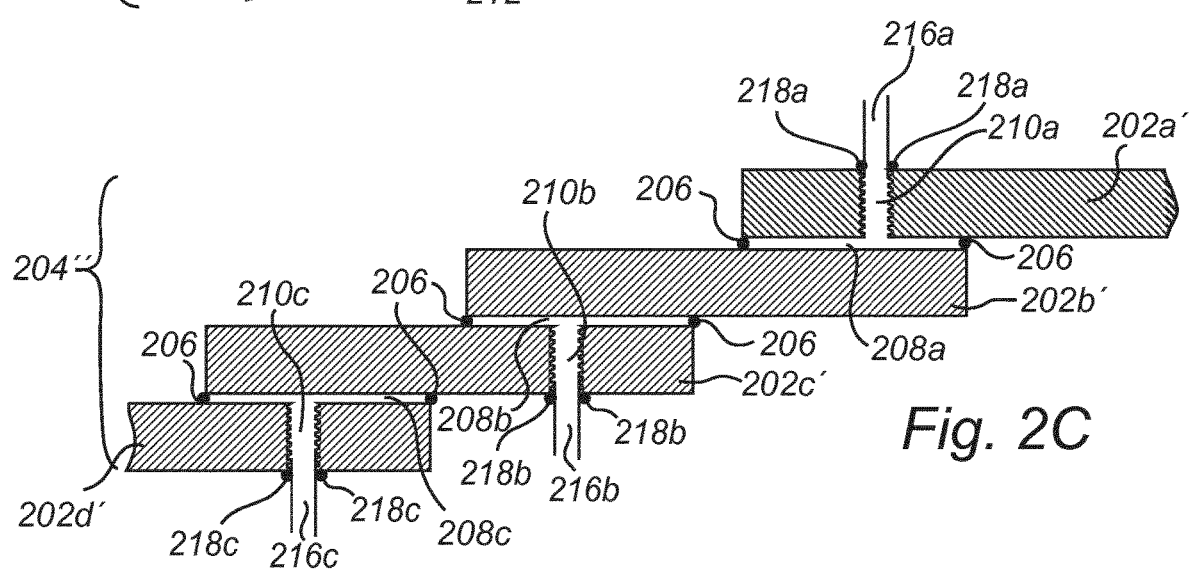

FIG. 2C shows an alternative version of a tilted stack 204" with a plurality of metal based sheets 202*a'*-*d'*. In FIG. 2C, the stack 204" comprises a first metal based sheet 202*a'*, a last metal based sheet 202*d'* and two intermediate metal based sheets 202'*b*, 202*c'*, i.e. a first intermediate metal based sheet 202*b'* and a second intermediate metal based sheet 202*c'*. The perimetrically sealing of the stack 204" of FIG. 2C is similar to that described above with reference to FIG. 2B, i.e. an edge of one of the plurality of metal based sheets 202*a'*-*d'* has been welded to a top or a bottom portion (e.g. a top surface portion or a bottom surface portion, respectively) of another one of the plurality of metal based sheets 202*a'*-*d'*, and are thus not described here in detail again (the perimetrical seal is embodied as welds commonly indicated with the reference numeral 206).

In FIG. 2C, no portion of the first metal based sheet 202*a'* covers neither the second intermediate metal based sheet 202*c'* nor the last metal based sheet 202*d'* (i.e. in the cross sectional view of the stack in FIG. 2C, the first metal based sheet 202*a'* does not overlap vertically with the second intermediate metal based sheet 202*c'* or the last metal based sheet 202*d'*). Further, the first intermediate metal based sheet 202*b'* does not cover the last metal based sheet 202*d'* (i.e. in the cross sectional view of the stack in FIG. 2C, the first intermediate metal based sheet 202*b'* does not overlap vertically with the last metal based sheet 202*d'*). Therefore, the stack 204" is provided with three cavities 208*a*-*c*. Hence, there are no common cavity as in the stack 204 and 204' in FIGS. 2A and 2B respectively. The stack 204" further comprises a first gas evacuating aperture 210*a*, which is embodied as a hole or opening 210*a*, in the first metal based sheet 202*a'*, a second gas evacuating aperture 210*b*, which is embodied as a hole or opening 210*b*, in the second intermediate metal based sheet 202*c'* and a third gas evacuating aperture 210*c* which is embodied as a hole or opening 210*c*, in the last metal based sheet 202*d'*. The first gas evacuating aperture 210*a* is fluidly connected with the first cavity 208*a*, whereas the second gas evacuating aperture 210*b* is fluidly connected to the second cavity 208*b* and correspondingly, the third gas evacuating aperture 210*c* is fluidly connected to the third cavity 208*c*. A first crimp tube 216*a* is attached to the first metal based sheet 202*a'* by a weld 218*a*, which first crimp tube 216*a* covers the first gas evacuating aperture 210*a*. A second crimp tube 216*b* is attached to the second intermediate metal based sheet 202*c'* by a weld 218*b*, which second crimp tube covers the second gas evacuating aperture 210*b*. Likewise, a third crimp tube 216*c* is attached to the last metal based sheet 202*d'* by a weld 218*c*, which second crimp tube covers the second gas evacuating aperture 210*c*.

FIG. 2D shows a cross-section of a first stack portion 204*a* and a second stack portion 204*b*. The first stack portion 204*a*, which is here a horizontal stack portion, comprises a first plurality of metal based sheets 202*a-c* very similar to the stack 204 of FIG. 2A (with the exception that in FIG. 2D, the last metal based sheet 202*c* comprises the first gas evacuating aperture 210 attached to the corresponding first crimp tube 216) why the same reference numerals are used here as well, and the second stack portion 204*b*, which is here a vertical stack portion, comprises a second plurality of metal based sheets 202*e-g*, a cavity 208*b'*, a second gas evacuating aperture 210*b'* and corresponding second crimp tube 216*b'*. As the first stack portion 204*a* of FIG. 2D is in large the same as the stack 204 in FIG. 2A), focus on the description related to FIG. 2D will be on the differences compared to the FIG. 2A.

In FIG. 2D, the second stack portion 204*b* is arranged perpendicular to the first stack portion 204*a*. Further, the second stack portion 204*b* is attached to said first stack portion by means of welding. Prior to subjecting the first and second stack portions 204*a*, 204*b* to a HIPping process step, the first cavity 208*a* and the second cavity 208*b* may be evacuated simultaneously or subsequently through the first gas evacuating aperture 210*a* and the second gas escaping aperture 210*b*, respectively using the corresponding first 216*a* and second crimp tube 216*b*.

FIG. 2E shows a cross-section of an alternative arrangement of the first stack portion 204*a* and the second stack portion 204*b* of FIG. 2D. The first stack portion 204*a* and the second stack portion 204*b* may be the same as the first stack portion 204*a* and the second stack portion 204*b* of FIG. 2D. In FIG. 2E, the second stack portion 204*b* is arranged with an angle α to the first stack portion 204*a* and attached to the same with means of welding. As second stack portion 204*b* is arranged with an angle α to the first stack portion 204*a*, the value of α is by definition always within the rage of 0° to 90°. According to one example the angle α is larger than 0°, or at least 3°, or at least 5°, or at least 10°, or at least 20°, or at least 30°, or at least 40°, or at least 50°, or at least 60°, or at least 70°, or at least 80°. Additionally or alternatively, the angle α is equal to 90, or no more than 85°, or no more than 80°, or no more than 70°, or no more than 60°, or no more than 50°, or no more than 40°, or no more than 30°, or no more than 20°, or no more than 10°. According to one example the angle α is within the range of 3°-90° Evacuation of the first and the second cavities 208*a*, 208*b* may occur simultaneously or subsequently.

FIG. 2F shows a cross-section of an alternative arrangement of the first stack portion 204*a* and the second stack portion 204*b* of FIG. 2D. The first stack portion 204*a* and the second stack portion 204*b* may be the same as the first stack portion 204*a* and the second stack portion 204*b* of FIG. 2D and/or of FIG. 2E, however in FIG. 2F, the first metal based sheet 202*a* of the first stack portion 204*a* comprises the first gas evacuating aperture attached to the corresponding first crimp tube (i.e. similar to the stack 204 of FIG. 2A). In FIG. 2F, the second stack portion 204*b* is arranged perpendicular to the first stack portion 204*a*, but here, at least a part of the second stack portion 204*b* is embedded in the first metal based sheet 202*a* of the first stack portion 204*a*.

FIG. 2G shows a stack 204''' comprising a plurality of metal based sheets 202*a''-c''*. As the stack 204''' of FIG. 2G is in large the same as the stack 204' in FIG. 2B, why corresponding features are referred to with corresponding reference numerals, focus on the description related to FIG. 2G will be on the differences compared to the FIG. 2B (however note that in FIG. 2G, only one intermediate metal based sheet 202*b''* comprising an opening 212'' is provided whereas in FIG. 2B, two intermediate metal based sheets 202*b*1, 202*b*2 arranged side-by-side are provided). In FIG. 2G, the first metal based sheet 202*a''* and the last metal based sheet 202*c''* are bended, whereas the intermediate metal based sheet 202*b''* is planar. The bending of the first and the last metal based sheets 202*a''*, 202*c''* may be done prior to arranging the plurality of metal based sheets 202*a''-c''* in the stack 204'''.

Figure 9:
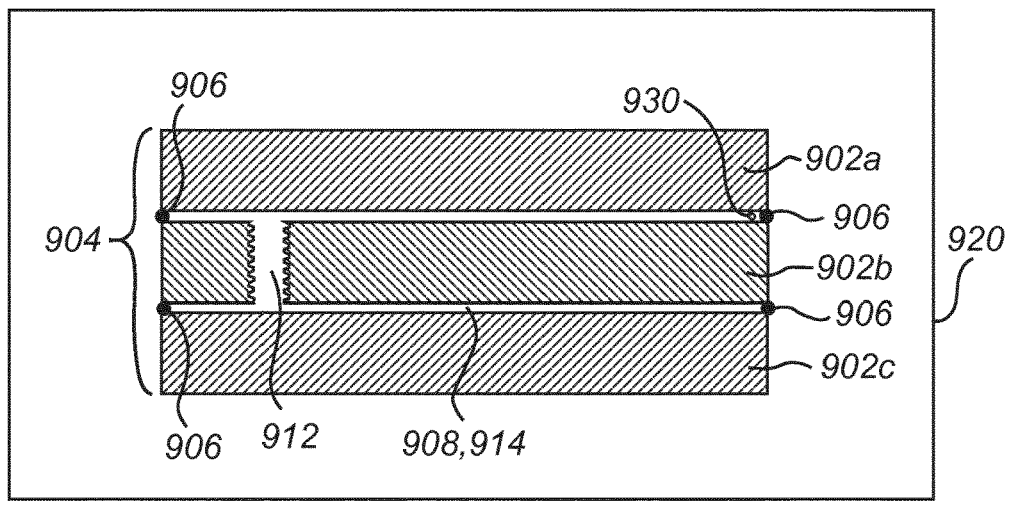
FIG. 9 shows a schematic, cross-sectional view of a stack comprising a plurality of metal based sheets in accordance with at least one example embodiment of the invention.

FIG. 9 shows a stack 904 similar to that of stack 204 in FIG. 2A, but with the difference that the stack 904 comprises no gas evacuating aperture, and hence, no crimp tube. Thus, stack 904 comprises a plurality of metal based sheets 902*a-c*, which is arranged inside a hot isostatic pressing equipment 920. Here, each one of the plurality of metal based sheets 902*a-c* has a rectangular cross section. The stack comprises a first metal based sheet 902*a*, an intermediate metal based sheet 902*b* and a last metal based sheet 902*c*. The intermediate metal based sheet 902*b* comprises an opening 912.

The stack 904 is a horizontal stack 904. In other words, the plurality of metal based sheets 902*a-c* is horizontally arranged. The stack 904 has been perimetrically sealed with welds 906. Here, the edges of plurality of metal based sheets 902*a-c* has been welded together forming the welds 906. The welds, together with the plurality of metal based sheets 902*a-c* forms a cavity 908, which is here a common cavity 914, or a single cavity 914, of the stack 904 since the opening 912 in said intermediate metal based sheet 902*b* fluidly connects the portion of the cavity 908 which is arranged in between the first metal based sheet 902*a* and the intermediate metal based sheet 902*b* and the portion of the cavity 908 which is arranged between the intermediate metal based sheet 902*b* and the last metal based sheet 902*c*.

Thus, in FIG. 9, the cavity 908 is fluidly separated from the surroundings outside of the stack 904. In order to remove, or at least partly remove, gas inside of the cavity 908, the stack 904 has been provided with a chemical substance 930 being configured to react with the gas in the cavity 908 in order to remove the gas from it. Hence, the gas within the cavity 908 may react with the chemical substance 930 in such a way that the gas is removed. It should be noted that the gas may thus be removed by a reaction with the chemical substance 930 forming e.g. a solid material (i.e. not a gas), and/or be removed by absorption and trapping of the gas in the chemical substance 930.

According to at least one example embodiment, the chemical substance 930 is a Calcium based compound. For example, the chemical substance 930 comprises at least one of the following substances: Ca, Ti, Zr, Ca—Mg, Ca—Al, Ca—Zn, Ca—Cu, any alloy of the same or any eutectic alloys.

Figure 3:
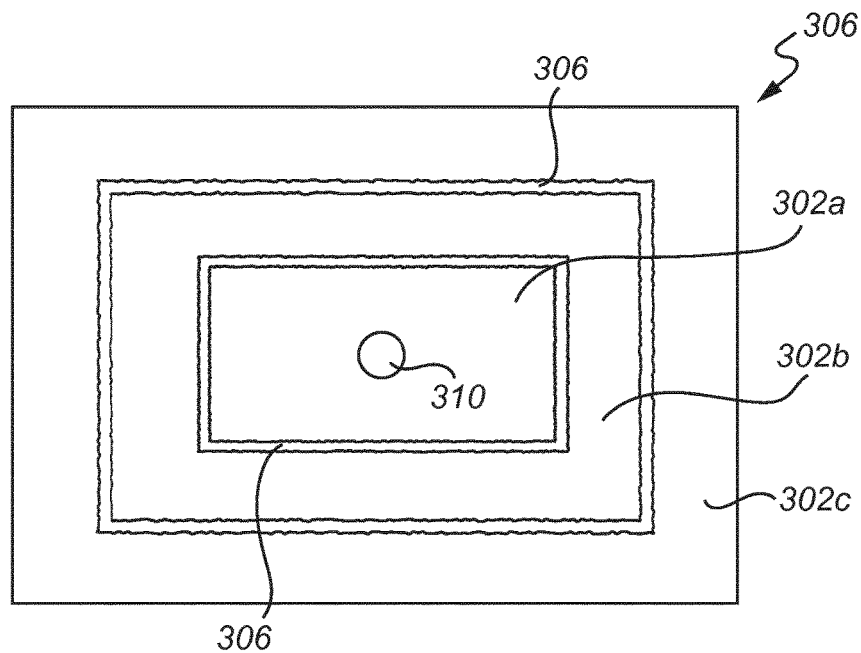
FIG. 3 shows a schematic, top view of a stack comprising a plurality of metal based sheets in accordance with at least one example embodiment of the invention.

FIG. 3 shows a top view of a stack 304 with a plurality of metal based sheets 302*a-c*. Here, each one of the plurality of metal based sheet 302*a-c* is a rectangular sheet, i.e. they have the same shape. In addition, here, the form of the stack 304 resemble the form of a pyramid. In other words, the size or the size of the surface area of each one of the plurality of metal based sheets 302*a-c* is not the same, with the first metal based sheet 302*a* having the smallest surface area and the last metal based sheet 302*c* having the largest surface area. The volume or the surface area may differ by at least 5%, such as by at least 10, preferably at least 15%. During the step of perimetrically sealing at least a portion of the stack 304, an edge of the first metal based sheet 302*a* is sealed to a top portion, such as a top surface portion, of the intermediate metal based sheet 302*b* by a weld 306*a*, and an edge of the intermediate metal based sheet 302*b* is sealed to a top portion, such as a top surface portion of the last metal based sheet 302*c* by a weld 306*b*. This sealing forms at least one cavity (not shown in FIG. 3) inside of said stack 304. Further, the stack comprises a gas evacuating aperture 310, e.g. a hole 310 in the first metal based sheet 302a. The gas evacuating aperture 310 is used to evacuating gas from the cavity inside the stack 304 as previously described.

Figures 4A, 4B:
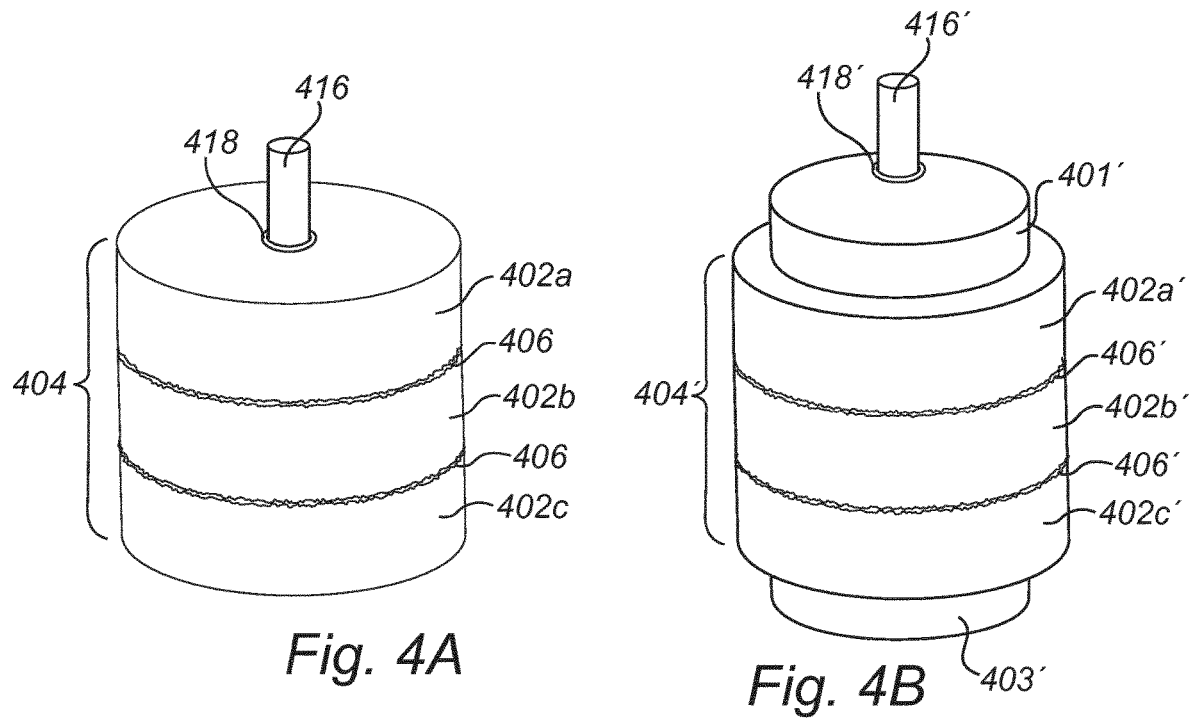
FIG. 4A shows a schematic, perspective view of a stack comprising a plurality of metal based sheets in accordance with at least one example embodiment of the invention.
FIG. 4B shows a schematic, perspective view of an alternative stack compared to FIG. 4A, the stack comprises a plurality of metal based sheets in accordance with at least one example embodiment of the invention.

FIG. 4A shows a stack 404 with a plurality of metal based sheets 402a-c. Here, each one of the plurality of metal based sheet 402a-c has the geometrical form of a circular disc. In an alternative embodiment, each one of the metal based sheets may have the geometrical form of a ring. The plurality of metal based sheets 402a-c in FIG. 4A are circumferentially sealed with welds 406. Further, the stack 404 comprises a crimp tube 416 which is attached to the stack 404 such that the opening of the crimp tube 416 covers a gas evacuating aperture (not shown in FIG. 4A). The gas evacuating aperture is in FIG. 4A an opening or a hole in the first metal based sheet 402a.

FIG. 4B shows an alternative stack 404' with a plurality of metal based sheets 401', 402a'-c', 403'. Here, each one of the plurality of metal based sheet 401', 402a'-c', 403' has the geometrical form of a circular disc. The plurality of metal based sheets 401', 402a'-c', 403' have in FIG. 4B at least two different sizes, a first size for the top metal based sheet 401', and the bottom metal based sheet 403', and a second size for the three metal based sheets 402a'-402c' which are arranged between the top metal based sheet 401' and the bottom metal based sheet 403'. The first and the second size may differ by at least 5%, such as by at least 10, preferably at least 15%. For example, the three metal based sheets 402a'-c' may be manufactured according to the method described in FIG. 1, and the top metal based sheet 401' and the bottom metal based sheet 403' may be attached to the three metal based sheets 402a'-c' in any suitable way. According to an alternative example, all five of the metal based sheets, 401', 402a'-c', 403' may be manufactured according to the method described in FIG. 1, and thus the top metal based sheet 401' may thus be the first metal based sheet 401', and the bottom metal based sheet 403' may be the last metal based sheet 403'. Further, the stack 404' may comprise a crimp tube 416' which is attached to the stack 404' such that the opening of the crimp tube 416' covers a gas evacuating aperture (not shown in FIG. 4B). Alternatively, the stack 404' comprises no gas evacuating aperture and no crimp tube, but is instead provided with a chemical substance to remove the gas, as described with reference to FIG. 9.

Figure 5A:
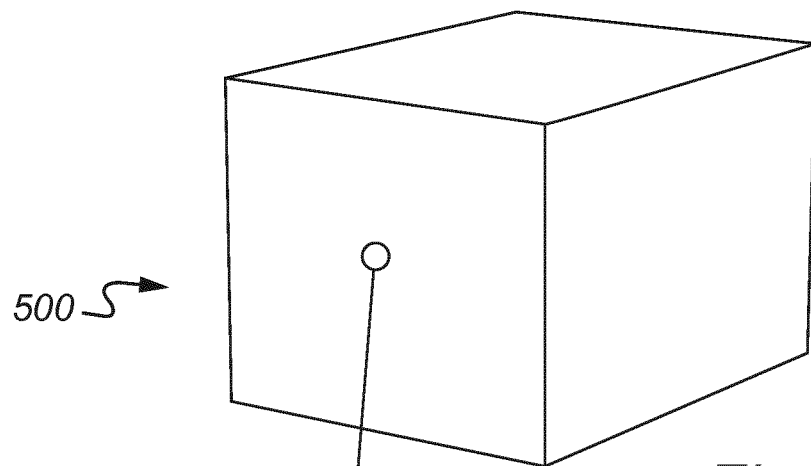
FIG. 5A shows a schematic view of a metal based component in accordance with at least one example embodiment of the invention.

FIG. 5A shows a schematic view of a metal based component 500. The metal based component 500 is here a metal cube. When examining a cross-section of said metal based component by microscope, a trace 502 of former interfaces between the plurality of metal based sheets is visible. The trace 502 is typically a line 504, along which line a crystallographic mismatch of metal grains 506 is arranged (in the enlarged view in FIG. 5A, a trace from the interlayer interface between two neighboring metal based sheets is shown).

Figure 5B:
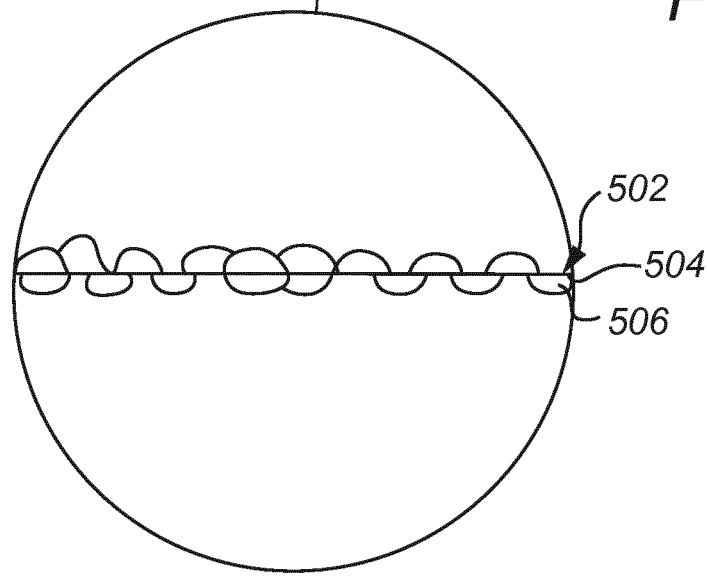
FIG. 5B shows a micrograph of a trace in a metal based component in accordance with at least one example embodiment of the invention.
Figure 5B:
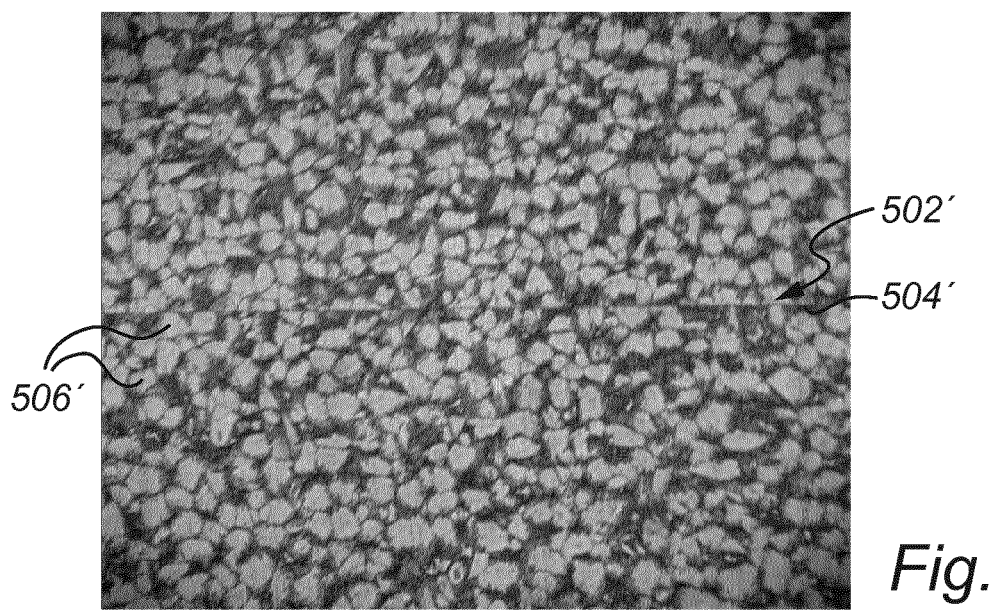

FIG. 5B shows a micrograph of a trace 502' of the interface between two of the plurality of metal based sheets, which trace is visible in the metal based compound after it is manufactured. In the micrograph, the line 504', along which line a crystallographic mismatch of metal grains 506' is clearly visible.

Figure 6A:
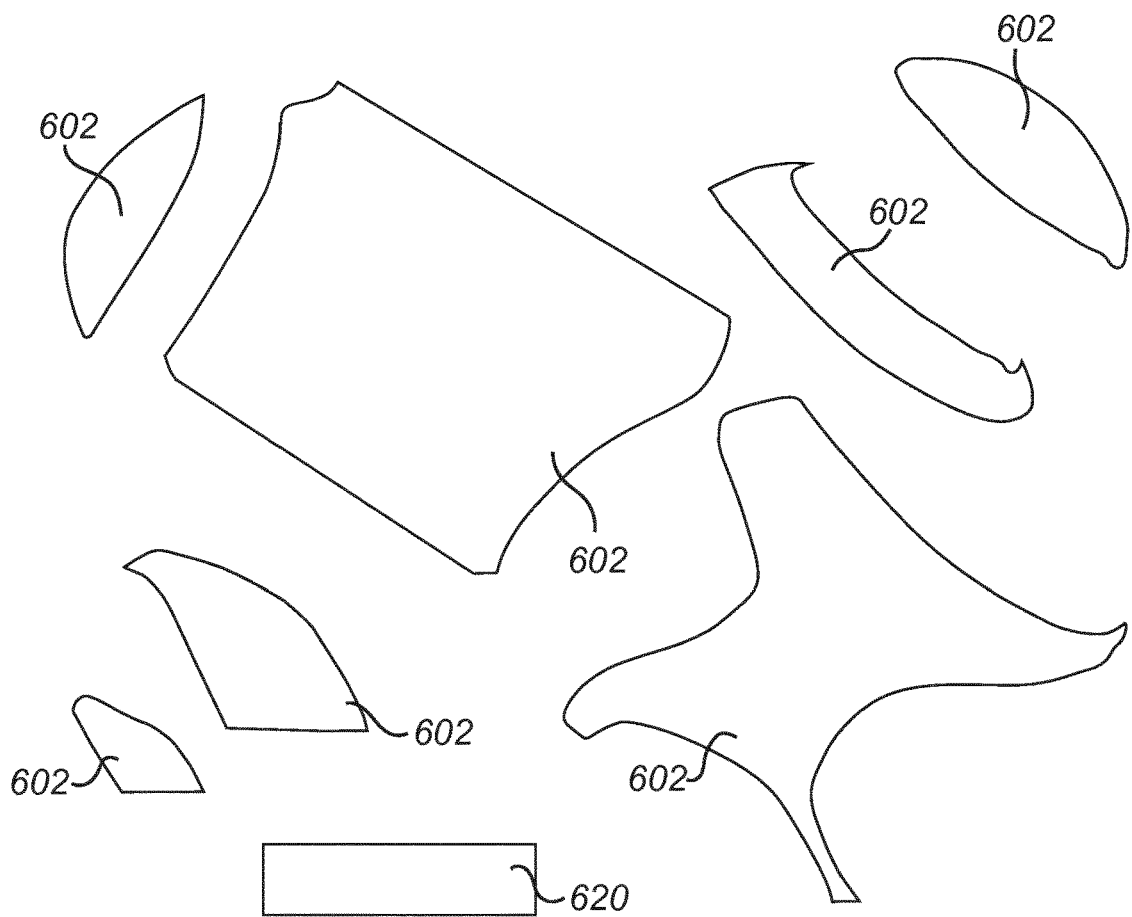
FIG. 6A shows a schematic view of a plurality of metal based sheets in accordance with at least one example embodiment of the invention.

FIG. 6A shows a plurality of metal based sheets 602 and a base plate 620 prior to being arranged in a stack. It should be noted that the base plate 620 may be a forged piece 620 or a casted piece 620. Each of the plurality of metal based sheets 602 has a shape and/or a size which is different from any other one of the plurality of metal based sheets 602. The use of a plurality of metal based sheets 602 having different shapes and sizes allows for manufacturing of a complex metal based component.

Figure 6B:
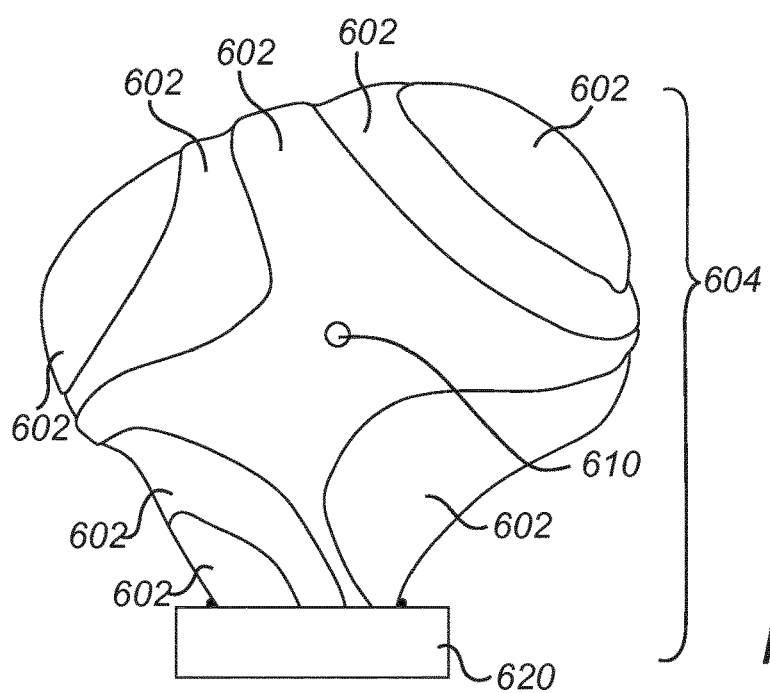
FIG. 6B shows a schematic view of a stack comprising a plurality of metal based sheets in accordance with at least one example embodiment of the invention.

FIG. 6B shows a side view of a stack 604 comprising the plurality of metal based sheets 602 of FIG. 6A. The stack 604 is arranged on top of the base plate 620. Further, the stack comprising a gas evacuating aperture 610. Here, the stack 604 resemble a vane of a marine propeller, which is the resulting product after the HIPping. Each of the plurality of metal based sheets 602 are perimetrically sealed to at least another one other of the plurality of metal based sheets 602. For example, at least one edge portion of one of the plurality of metal based sheets 602 is perimetrically sealed to a top portion, such as a top surface portion, of another one of the plurality of metal based sheets 602. In FIG. 6B the sheets are neither of the same size nor of the same shape.

Figure 7:
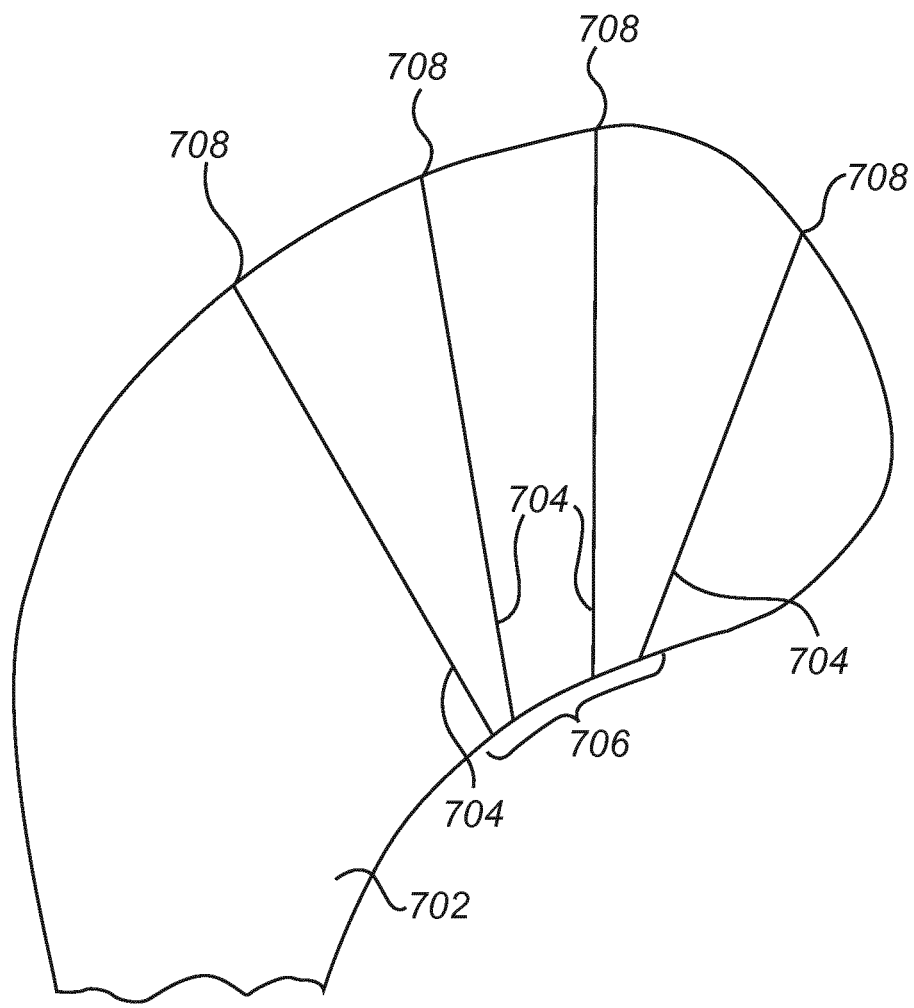
FIG. 7 shows a top view of a metal based sheet in accordance with at least one example embodiment of the invention.

FIG. 7 shows one metal based sheet 702, which together with other similar metal based sheets may be arranged in a stack prior to HIPping. The metal based sheet 702 is bent along a plurality of lines 704. Each of the plurality of lines originates from an origin edge portion 706 and extends over the metal based sheet 702 to a respective edge portion 708 distant from the origin edge portion 706. Stated differently, in when the metal based sheet 702 is formed, the metal based sheet are bent along a set of lines 704 which extends radially spaced from each other, each one starting in an origin edge portion 706 and ending in a respective edge portion 708 distant from the origin edge portion 706. The lines 704 may optionally be predetermined lines which are marked by for example a drawn line or a groove.

Figure 8:
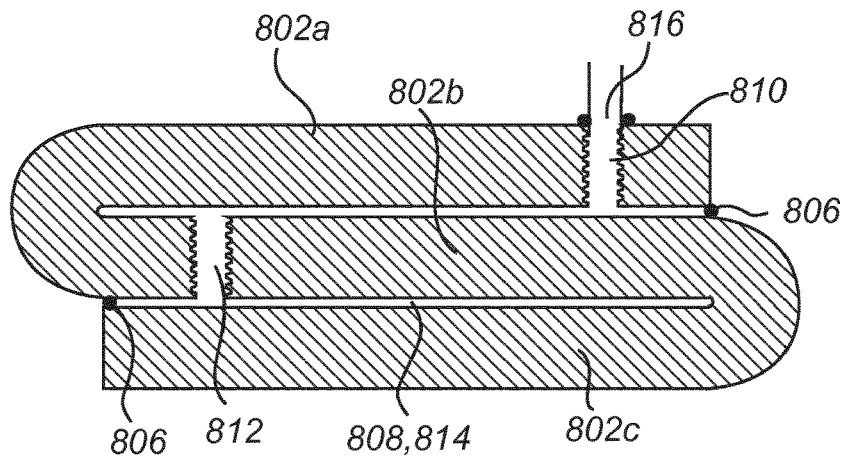
FIG. 8 shows a schematic, cross-sectional view of a stack comprising a folded metal based sheet comprising a plurality of metal based sheets in accordance with at least one example embodiment of the invention.

FIG. 8 shows a folded metal based sheet 800 forming a stack 804 comprising a first metal based sheet 802a, an intermediate metal based sheet 802b and a last metal based sheet 802c. The intermediate metal based sheet 802b comprises an opening 812. The stack 804 is provided with a gas evacuating aperture 810 in the first metal based sheet 802a. A crimp tube 816 is attached to the stack 804 such that it covers said gas evacuating aperture 810, as previously described. As also previously described, the stack 804 has been perimetrically sealed with welds 806. Here, the edges of the plurality of metal based sheets 802a-c, or stated differently edge portions of the folded metal based sheet 800, have been welded together forming the welds 806. The welds 806, together with the plurality of metal based sheets 802a-c forms a cavity 808, which is here a common cavity 814, or a single cavity 814, of the stack 804 since the opening 812 in said intermediate metal based sheet 802b fluidly connects the portion of the cavity 808 which is arranged in between the first metal based sheet 802a and the intermediate metal based sheet 802b and the portion of the cavity 808 which is arranged between the intermediate metal based sheet 802b and the last metal based sheet 802c. As is shown in FIG. 8, welds are not needed in the sections or portions where the folded metal based sheet 800 is folded. The set-up in FIG. 8 is preferably used for thin, but yet strong, metal based sheets.

Thus, in FIG. 8, and according to at least one example embodiment of the invention, the first, intermediate and last metal based sheets 802a-802c are defined as respective portions 802a-802c of the folded metal based sheet 800."

Figure 10:
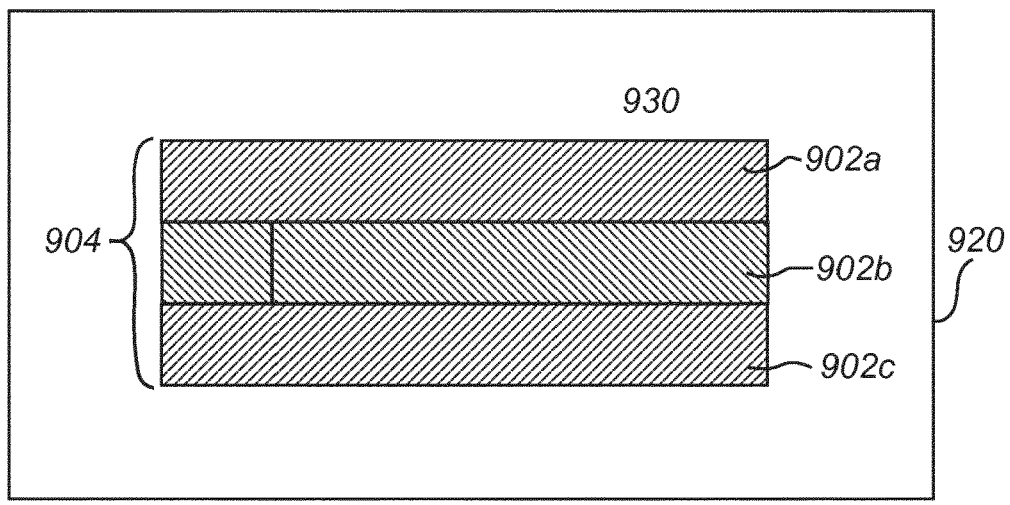
FIG. 10 shows a schematic, cross-sectional view of a solid metal based component according to the invention.

FIG. 10 shows a solid metal based component of the inventive method in a schematic cross-section, after treatment in the HIP equipment 1020. All cavities and passages in the stack 1004 has been closed by bonding between adjacent metal sheets 1002a-c.

Figure 11A:
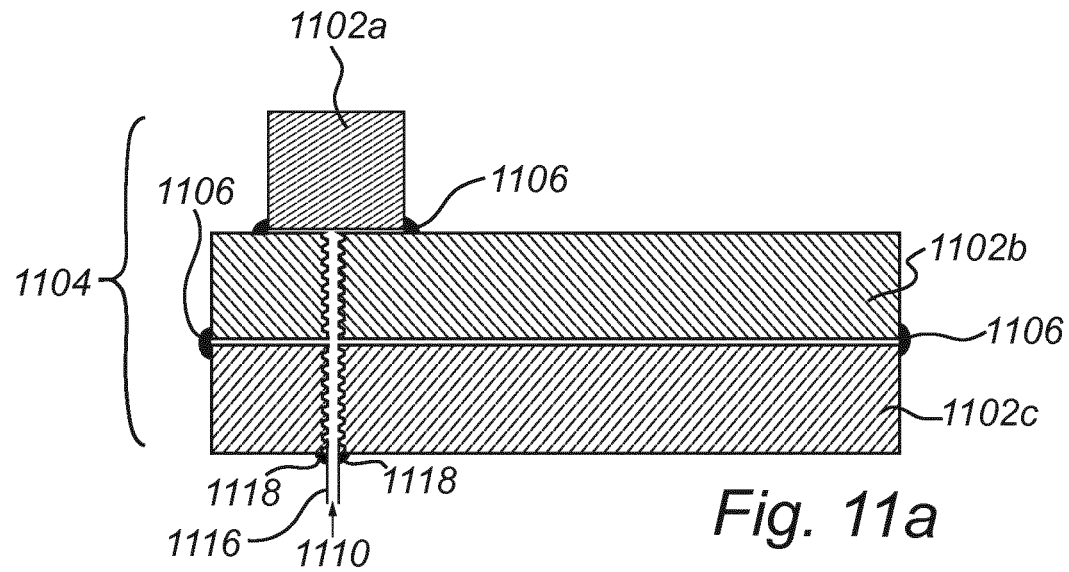
FIG. 11a shows a schematic, cross-sectional view of a stack comprising a plurality of metal based sheets in accordance with at least one example embodiment of the invention.

FIG. 11a shows a cross-section of a stack 1104 of a plurality of metal based sheets 1102a-c, which is arranged inside a hot isostatic pressing equipment (the hot isostatic pressing equipment is e.g. shown in FIG. 2A, and has been removed for enhanced readability in the other figures). In more detail there is a first metal based sheet 1102a, an intermediate metal based sheet 1102b and a last metal based sheet 1102c arranged in a stack 1104. In this embodiment, the sheets preferably have a circular disc shape, but other shapes can be contemplated. The first metal based sheet 1102a has a smaller surface area than the last metal based sheet 1102c and intermediate metal based sheet 1102b. The size or the size of the surface area may differ by at least 5%, such as by at least 10, preferably at least 15%. The first sheet 1102a is provided off-set from the center of the intermediate sheet 1102b. The first sheet 1102a is preferably made of a different material (such as cobalt) than the last metal based sheet 1102c and the intermediate metal based sheet 1102b, which e.g. are arranged of steel. The sheets have been perimetrically sealed with welds 1106. This sealing forms at least one cavity 1108 inside of said stack 1104 The stack is provided with a gas evacuating aperture 1110 in the last metal based sheet 1102c and the intermediate metal based sheet 1102b. A crimp tube 1116 is attached to the stack 1104 such that it covers said gas evacuating aperture 1110. The crimp tube 1116 is attached to said stack 1104 by a weld 1118, but it may as well be sealingly attached to the stack 1104 by other means.

Figure 11B:
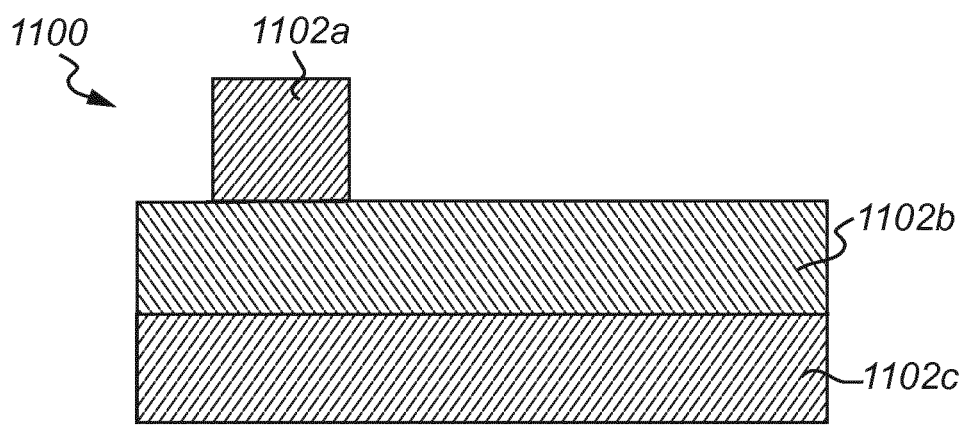
FIG. 11b shows a schematic, cross-sectional view of a solid metal based component according to the invention.

FIG. 11b shows a schematic cross-section of a solid metal based component 1100 of the inventive method after treatment in the HIP equipment. All cavities and passages in the material has been closed by bonding between adjacent metal sheets 1102a-c.

Figure 11C:
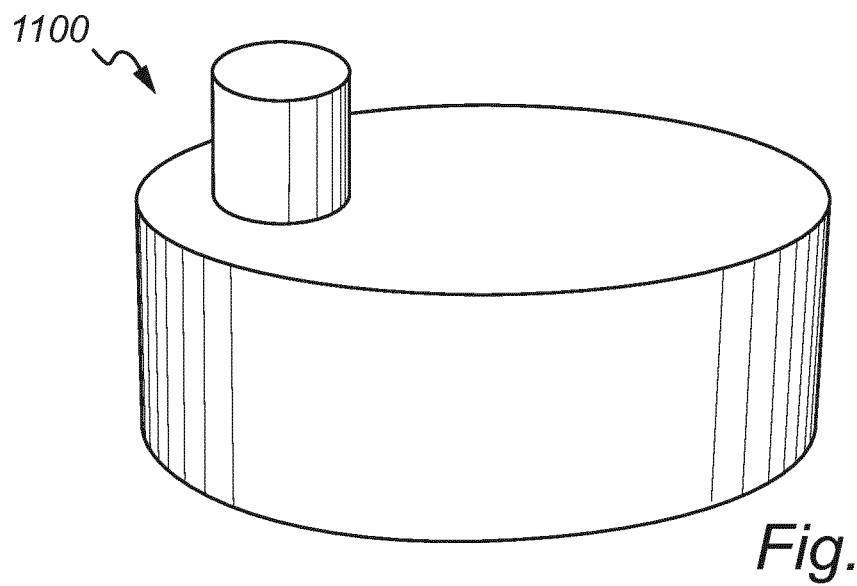
FIG. 11c shows a schematic, perspective view of the solid metal based component shown in FIG. 11b.

FIG. 11c shows a schematic, perspective view of the solid metal based component shown in FIG. 11b.

The skilled person realizes that a number of modifications of the embodiments described herein are possible without departing from the scope of the invention, which is defined in the appended claims. For instance, the shape and the thickness of the plurality of metal based sheets may vary. Further, the number of sheets, gas evacuating apertures, cavities etc. may be varied in many different ways. Moreover, the skilled person realizes that the method as described herein is suitable for manufacturing a wide variety of metal based components. Furthermore, it should be noted that each of the embodiments described herein may be arranged and configured to remove gas from the at least one cavity, either by using a chemical substance (as described with reference to FIG. 9), or by using at least one gas evacuating aperture and preferably a corresponding crimp tube (as described with reference to FIGS. 2A-2G, FIG. 3, FIG. 4A, FIG. 4B and FIG. 8). Thus, any stack described as having at least one gas evacuating aperture, may instead be provided with a chemical substance inside of the stack, and the gas evacuating aperture can be omitted together with any corresponding crimp tube.

ITEMIZED LIST OF EMBODIMENTS

1. A method for manufacturing a metal based component comprising the steps of:
   providing a plurality of metal based sheets;
   arranging said plurality of metal based sheets in a stack, wherein said stack comprises a first metal based sheet, a last metal based sheet and at least one intermediate metal based sheet;
   perimetrically sealing at least a portion of said stack forming at least one cavity inside of said stack;
   removing gas from said at least one cavity;
   subjecting said stack to a hot isostatic pressing process for a predetermined time at a predetermined pressure and a predetermined temperature so that the plurality of metal based sheets of said stack bond metallurgically to each other.

2. The method according to item 1, wherein said step of removing gas from said at least one cavity comprises the sub-steps of:
   providing at least one gas evacuating aperture fluidly connected to said at least one cavity inside of said stack;
   evacuating gas from said at least one cavity inside of said stack via said at least one gas evacuating aperture.

3. The method according to item 1, wherein said step of removing gas from said at least one cavity comprises the sub-step of:
   providing a chemical substance within said stack, said chemical substance being configured to react with said gas in said at least one cavity in order to remove said gas.

4. The method according to any one of the preceding items, wherein said stack provides a passage at least partly defined by a surface of said at least one intermediate metal based sheet, such that said at least one cavity is fluidly connected to said first metal based sheet, and is fluidly connected to said last metal based sheet.

5. The method according to item 4, wherein said passage is an opening, such as e.g. a hole, in said at least one intermediate metal based sheet, or wherein said stack comprises at least two intermediate metal based sheets arranged side by side, and wherein said passage is a gap between said at least two intermediate metal based sheets.

6. The method according to any one of the preceding items, wherein said at least one cavity is a first cavity within said stack, and wherein said method further comprises the steps of:
   providing a second cavity within said stack,
   removing gas from said second cavity inside of said stack.

7. The method according to any one of the items 2, or 4-6 when being dependent on item 2, wherein said at least one gas evacuating aperture is arranged in the envelope of said stack, e.g. in said first metal based sheet and/or said last metal based sheet.

8. The method according to item 7, wherein a gas evacuating crimp tube is attached to said stack, wherein an opening of said gas evacuating crimp tube covers said at least one gas evacuating aperture; and
   wherein said method further comprises the step of sealing said gas evacuating crimp tube after the step of evacuating said gas from said at least one cavity inside of said stack but prior to the step of subjecting said stack to a hot isostatic pressing process.

9. The method according to any one of the preceding items, comprising the step of surface treating and/or coating at least one metal based sheet in said plurality of metal based sheets.

10. The method according to any one of the preceding items, wherein said method further comprises:
    shaping at least one of said plurality of metal based sheets into a 2D shape, and/or forming at least one of said plurality of metal based sheets into a 3D geometry.

11. The method according to any one of the preceding items, wherein the material composition of at least one metal based sheet in the plurality of metal based sheets is different compared to the material composition of another metal based sheet in the plurality of metal based sheets, and/or wherein the material composition of a portion of the metal based component is different compared to the material composition of another portion of the metal based component.

12. A method according to any one of the preceding items, further comprising the steps of:
providing a pre-existing metal based component
creating at least one smooth surface on said pre-existing metal based component;
wherein said step of arranging said plurality of metal based sheets in a stack comprises forming said stack to include said smooth surface in such way that one of said first metal based sheet or said last metal based sheet is adjacent, or in contact with, said at least one smooth surface.

13. A single-piece, metal based component comprising a body formed by at least three metal based sheets arranged in stack wherein said at least three metal based sheets have been perimetrically sealed to each other; and
wherein said one of said at least three metal based sheets has been metallurgically bonded to at least another one of said at least three sheets during the process of a hot isostatic pressing for a predetermined time at a predetermined pressure and a predetermined temperature.

14. The single-piece, metal based component according to item 13, wherein said metal based component comprises traces of former interfaces between two adjacent metal based sheets, wherein said traces are formed by crystallographic mismatch.

15. The single-piece, metal based component according to item 13 or 14, wherein said metal based component comprises traces of former openings or former openings fillings e.g. wires, wherein said traces are formed by crystallographic mismatch.

16. The single-piece, metal based component, according to any one of items 13-15, comprising a portion being formed in a 3D geometry, such as e.g. a bent portion, of at least one of said at least three metal based sheets.

17. A single-piece metal based component, wherein said single-piece metal based component is manufactured by the method according to any one of items 1-12.

The invention claimed is:

1. A method for manufacturing a solid, non-hollow metal based component comprising the steps of:
providing a plurality of metal based sheets;
arranging said plurality of metal based sheets in a stack, wherein said stack comprises a first metal based sheet, a last metal based sheet and at least one intermediate metal based sheet;
perimetrically sealing each sheet of the plurality of metal based sheets to at least another sheet of the plurality of metal based sheets, thereby forming at least one cavity inside of said stack;
removing gas from said at least one cavity;
subjecting said stack to a hot isostatic pressing process for a predetermined time at a predetermined pressure and a predetermined temperature, thereby closing the at least one cavity so that the plurality of metal based sheets of said stack bond metallurgically to each other and so that the entire stack of metal based sheets is solid and non-hollow, to thereby form the solid, non-hollow metal based component;
wherein said stack provides a passage at least partly defined by a surface of said at least one intermediate metal based sheet, such that said at least one cavity is fluidly connected to said first metal based sheet and is fluidly connected to said last metal based sheet.

2. The method according to claim 1, wherein said step of removing gas from said at least one cavity comprises the sub-steps of:
providing at least one gas evacuating aperture fluidly connected to said at least one cavity inside of said stack; and
evacuating gas from said at least one cavity inside of said stack via said at least one gas evacuating aperture.

3. The method according to claim 1, wherein said step of removing gas from said at least one cavity comprises the sub-step of providing a chemical substance within said stack, said chemical substance being configured to react with said gas in said at least one cavity in order to remove said gas.

4. A method for manufacturing a solid, non-hollow metal based component comprising the steps of:
providing a plurality of metal based sheets;
arranging said plurality of metal based sheets in a stack, wherein said stack comprises a first metal based sheet, a last metal based sheet and at least one intermediate metal based sheet;
perimetrically sealing each sheet of the plurality of metal based sheets to at least another sheet of the plurality of metal based sheets, thereby forming at least one cavity inside of said stack;
removing gas from said at least one cavity;
subjecting said stack to a hot isostatic pressing process for a predetermined time at a predetermined pressure and a predetermined temperature, thereby closing the at least one cavity so that the plurality of metal based sheets of said stack bond metallurgically to each other and so that the entire stack of metal based sheets is solid and non-hollow, to thereby form the solid, non-hollow metal based component;
wherein said at least one cavity is a first cavity within said stack, and wherein said method further comprises the steps of:
providing a second cavity within said stack; and
removing gas from said second cavity inside of said stack;
wherein the second cavity is arranged in an envelope of said stack, and wherein the envelope is defined by the outer facing surfaces of said stack.

5. The method according to claim 1, wherein:
said passage is an opening in said at least one intermediate metal based sheet, or
said stack comprises at least two intermediate metal based sheets arranged side by side, and said passage is a gap between said at least two intermediate metal based sheets.

6. The method according to claim 1, wherein said at least one cavity is a first cavity within said stack, and wherein said method further comprises the steps of:
providing a second cavity within said stack; and
removing gas from said second cavity inside of said stack.

7. The method according to claim 4, wherein said stack provides a passage at least partly defined by a surface of said at least one intermediate metal based sheet, such that said at least one cavity is fluidly connected to said first metal based sheet and is fluidly connected to said last metal based sheet.

8. The method according to claim 4, wherein the second cavity is arranged in the envelope of said stack in said first metal based sheet and/or said last metal based sheet.

9. The method according to claim 4, wherein a gas evacuating crimp tube is attached to said stack, wherein an opening of said gas evacuating crimp tube covers the second cavity, and wherein said method further comprises the step of sealing said gas evacuating crimp tube after the step of evacuating said gas from said at least one cavity inside of said stack but prior to the step of subjecting said stack to a hot isostatic pressing process.

10. The method according to claim 1, comprising the step of surface treating and/or coating at least one metal based sheet in said plurality of metal based sheets.

11. The method according to claim 1, wherein said method further comprises:
shaping at least one of said plurality of metal based sheets into a 2D shape; and/or
forming at least one of said plurality of metal based sheets into a 3D geometry.

12. The method according to claim 1, wherein the material composition of at least one metal based sheet in the plurality of metal based sheets is different compared to the material composition of another metal based sheet in the plurality of metal based sheets, and/or wherein the material composition of a portion of the metal based component is different compared to the material composition of another portion of the metal based component.

13. A method according to claim 1, further comprising the steps of:
providing a pre-existing metal based component; and
creating at least one smooth surface on said pre-existing metal based component;
wherein said step of arranging said plurality of metal based sheets in a stack comprises forming said stack to include said smooth surface in such way that one of said first metal based sheet or said last metal based sheet is adjacent, or in contact with, said at least one smooth surface.

14. A method according to claim 1, wherein at least one of said metal based sheets has a size that differs from the size of the other metal based sheets; and/or wherein at least one of said metal based sheets has a shape that differs from the shape of the other metal based sheets.

15. A method according to claim 1, further comprising the step of providing a second plurality of metal based sheets, arranging said second plurality of metal based sheets in a second stack, wherein second stack is arranged with an angle α with regard to the first stack, wherein said angle α is larger than 0°, or at least 3°, or at least 5°, or at least 10°, or at least 20°, or at least 30°, or at least 40°.

16. A method according to claim 15, wherein the angle α is equal to 90, or no more than 85°, or no more than 80°, or no more than 70°, or no more than 60°, or no more than 50°.

17. A method according to claim 15, wherein said angle α is at most 90°, or within the range of 70° to 90°.

* * * * *